(12) United States Patent
Smith et al.

(10) Patent No.: US 7,104,734 B2
(45) Date of Patent: Sep. 12, 2006

(54) ONE-WAY PNEUMATIC DELIVERY SYSTEM

(75) Inventors: James F. Smith, Louisville, OH (US); Wesley A. Schroeder, Seville, OH (US)

(73) Assignee: HP Products, Inc., Louisville, OH (US)

( * ) Notice: Subject to any disclaimer, the term of this patent is extended or adjusted under 35 U.S.C. 154(b) by 939 days.

(21) Appl. No.: 09/835,790

(22) Filed: Apr. 16, 2001

(65) Prior Publication Data

US 2002/0150432 A1 Oct. 17, 2002

(51) Int. Cl.
*B65G 53/40* (2006.01)

(52) U.S. Cl. .......................................... 406/117; 406/83

(58) Field of Classification Search ................ 406/191, 406/192, 193, 194, 195, 196, 117, 176, 31, 406/148, 83, 120, 139
See application file for complete search history.

(56) References Cited

U.S. PATENT DOCUMENTS

| | | | | |
|---|---|---|---|---|
| 367,769 A | * | 8/1887 | Treat ............................ | 406/83 |
| 943,329 A | * | 12/1909 | Wolever .................... | 104/138.1 |
| 1,048,477 A | * | 12/1912 | Allington .................... | 137/625.4 |
| 1,586,634 A | * | 6/1926 | Maclaren et al. ............ | 406/148 |
| 1,776,697 A | * | 9/1930 | McGuinness et al. ....... | 406/192 |
| 1,823,056 A | * | 9/1931 | Marburg ....................... | 406/10 |
| 2,761,633 A | * | 9/1956 | Sindzinski .................... | 406/77 |
| 3,248,071 A | * | 4/1966 | Coook .......................... | 406/184 |
| 3,332,724 A | * | 7/1967 | Doucet ......................... | 406/82 |
| 3,892,372 A | * | 7/1975 | Hauber ..................... | 104/88.04 |
| 4,058,274 A | * | 11/1977 | Hochradel et al. ............. | 406/2 |
| 4,059,246 A | * | 11/1977 | Anders et al. .............. | 181/200 |
| 4,149,684 A | * | 4/1979 | Warmann .................... | 406/148 |
| 4,315,704 A | * | 2/1982 | Kelley et al. ............... | 406/110 |
| 4,529,335 A | * | 7/1985 | Hilbert et al. .................. | 406/1 |
| 4,941,777 A | * | 7/1990 | Kieronski ..................... | 406/13 |
| 4,971,481 A | * | 11/1990 | Foreman ....................... | 406/15 |
| 5,846,030 A | * | 12/1998 | Beard et al. ..................... | 406/1 |
| 6,109,837 A | * | 8/2000 | Mausy ........................ | 194/346 |

* cited by examiner

*Primary Examiner*—Christopher P. Ellis
*Assistant Examiner*—Richard Ridley
(74) *Attorney, Agent, or Firm*—Sand & Sebolt

(57) ABSTRACT

A one-way pneumatic delivery system includes a plurality of sending units in fluid communication with a receiving unit via a duct system. Each of the sending units and the receiving unit include a door that selectively prevents fluid communication into the duct system. When the carrier is inserted in one of the sending units, a power unit applies a vacuum to the duct system and the doors of the other sending units and of the receiving unit are sealed. The power unit both decelerates the carrier prior to its reception in the receiving unit and is configured to prevent the insertion of foreign objects into the vacuum source. A second embodiment is presented wherein the power unit is disposed in an upside-down configuration above a ceiling.

34 Claims, 15 Drawing Sheets

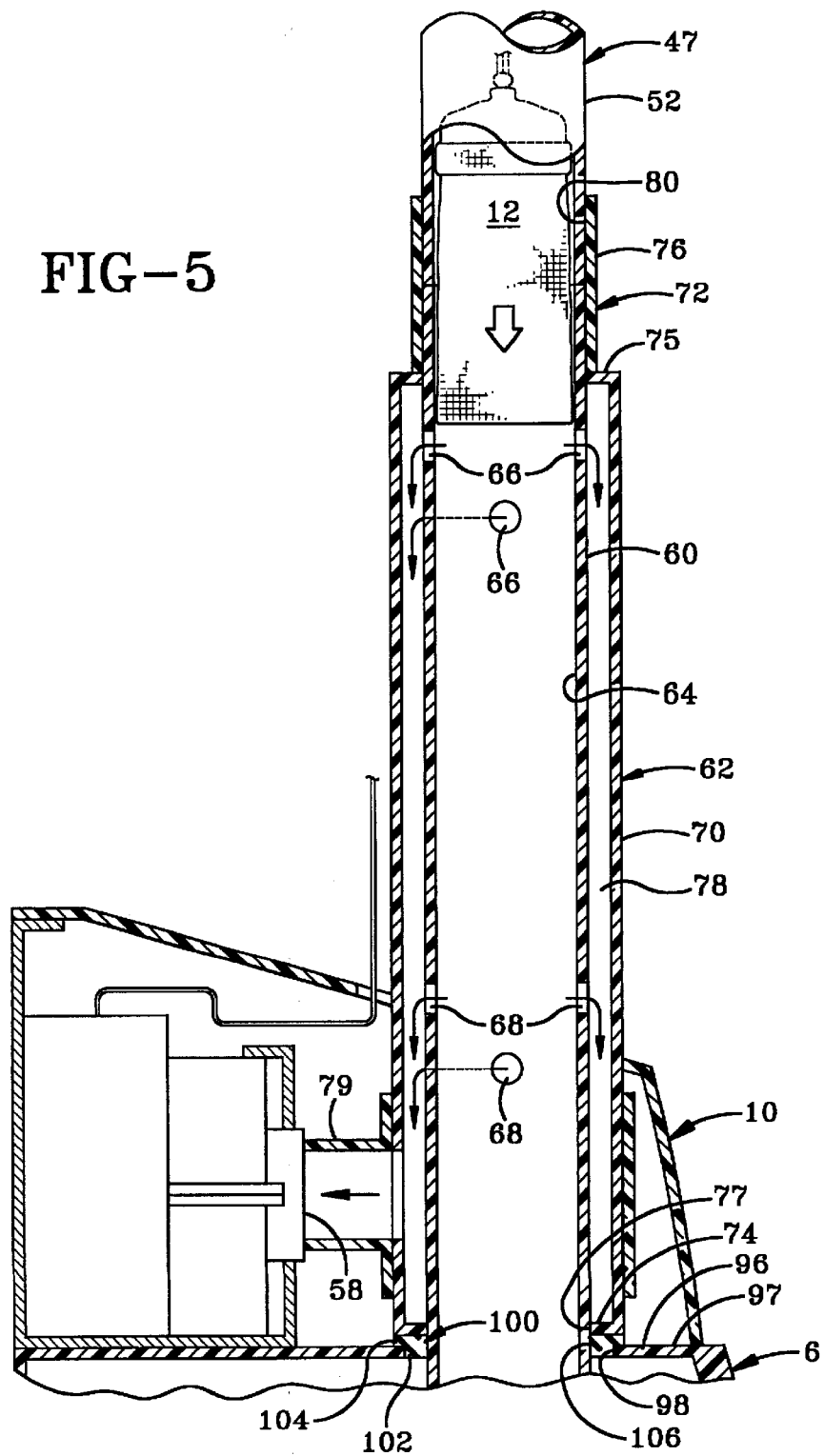

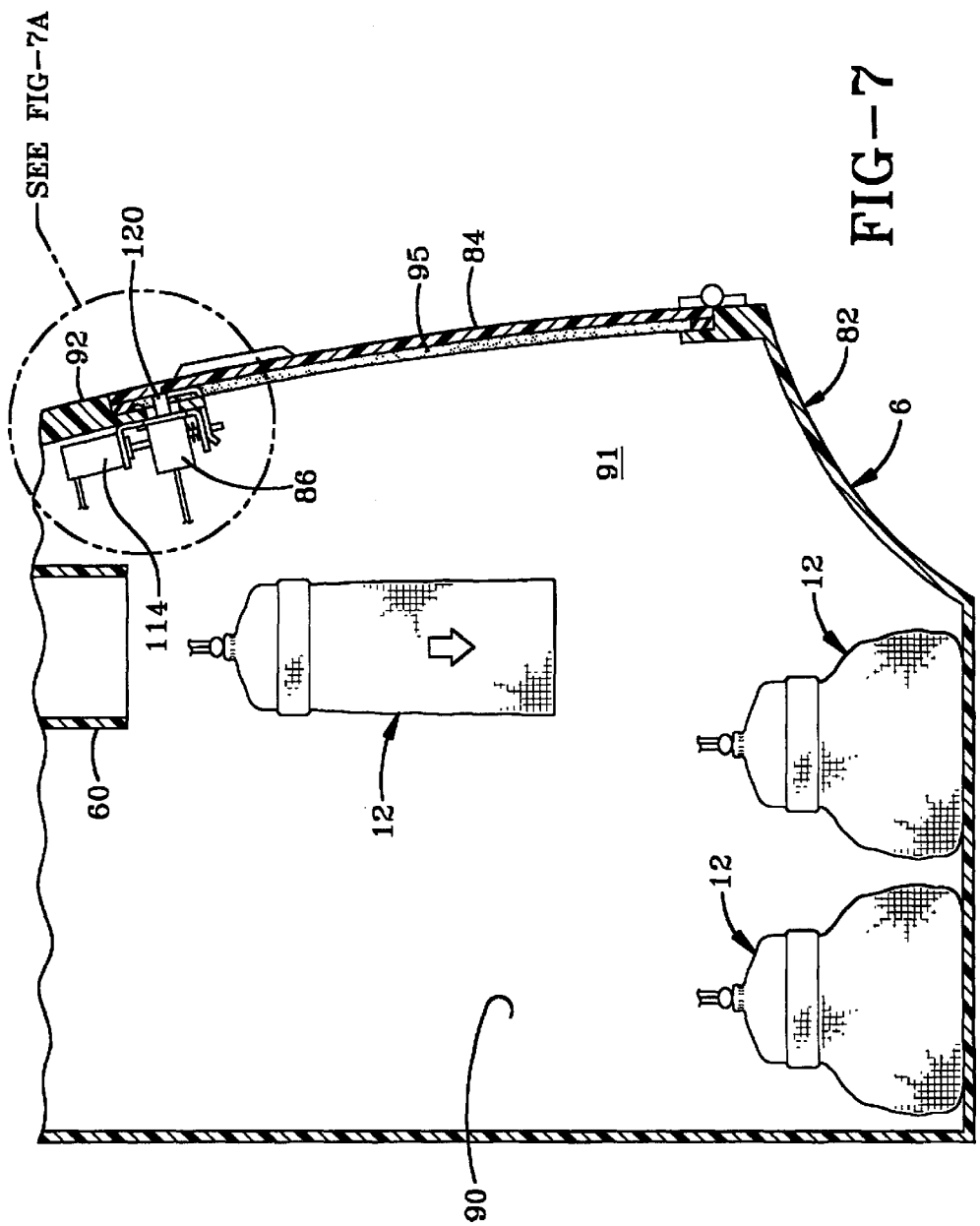

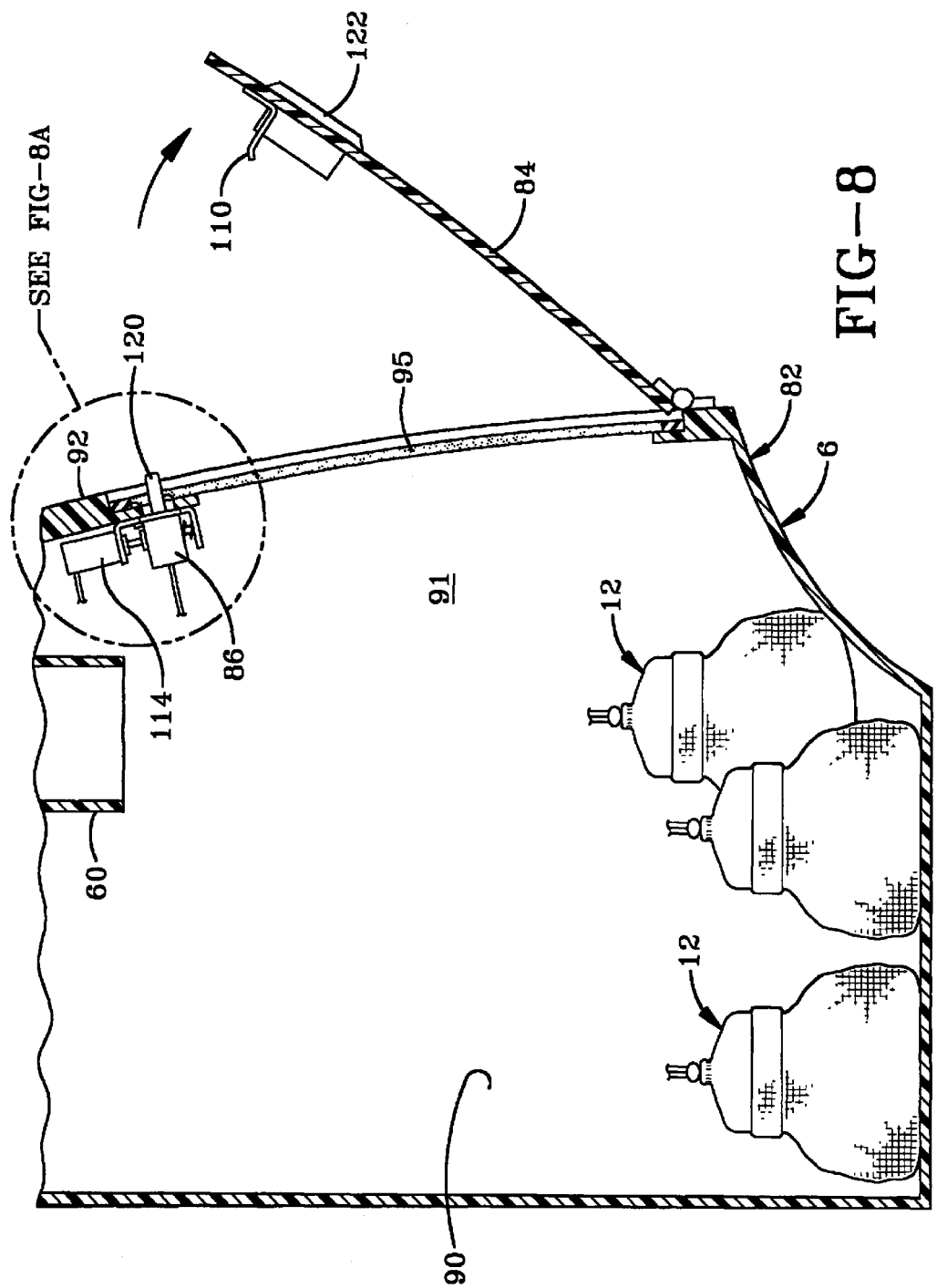

ONE-WAY PNEUMATIC DELIVERY SYSTEM

BACKGROUND OF THE INVENTION

1. Technical Field

The present invention relates generally to pneumatic delivery systems of the type intended for delivering small packages from one location to another and, more particularly, to a one-way pneumatic delivery system employing interconnected pipe structures that pneumatically deliver small packages from a plurality of initial locations to a single terminal location. Specifically, the invention relates to a one-way pneumatic delivery system employing a plurality of sending units that are attached via an interconnected duct system to a single receiving unit. A power unit applies a vacuum to the duct system to pneumatically deliver small packages from any of the sending units to the receiving unit.

2. Background Information

Numerous types of pneumatic delivery systems are known and understood in the relevant art. Pneumatic delivery systems typically include a duct system manufactured out of tubes having a circular cross section for delivering containers from initial locations to terminal locations. Such systems operate by applying a vacuum and/or a positive air pressure above ambient pressure to the duct system and, in turn, to the container therein to pneumatically draw and/or push the carrier through the duct system from the initial location to the terminal location.

Such pneumatic delivery systems typically are of either a one-way configuration or a two-way configuration. The one-way configuration is employed whenever delivery is desired only from an initial location to a terminal location. The return of any materials from the terminal location to the initial location must be achieved by hand carrying or through other delivery mechanisms. Such systems are particularly useful, for example, when small packages repeatedly need to be delivered from various locations to a central delivery location such as when numerous cashiers need to periodically deliver packages of cash and checks from cashier locations to a centralized accounting location.

A two-way pneumatic delivery system is a system wherein the container is delivered from an initial location to a terminal location and is then returned from the terminal location back to the initial location after the occurrence of a transaction. Such two-way pneumatic delivery systems are useful, for example, in drive-up banking applications wherein it is desired that the customer place deposit materials and/or a withdrawal slip into a container and deliver the container from an initial location at a drive-up window outside the bank to a terminal location inside the bank where the transaction is conducted by a teller upon receipt of the container at the terminal location. After the transaction has been completed, the teller returns the container through the duct system from the terminal location to the customer at the initial location.

The present invention is particularly directed to a one-way pneumatic delivery system. One-way pneumatic delivery systems typically include ducts or pipes having that extend from each of the initial locations to the terminal location with a vacuum and/or high pneumatic pressure being applied to the pipe to deliver a carrier inserted at the initial location through the pipe for delivery to the terminal location. The duct system typically includes individual pipes running from each initial location to the terminal location inasmuch as the vacuum and/or high pneumatic pressure must be applied to each pipe and must be of sufficient strength and with minimal leakage to ensure that the container is delivered completely through the pipe from the initial location to the terminal location without becoming stuck inside the pipe. Inasmuch as such pipes typically extend through walls, above ceilings, and below floors, such systems must be designed to ensure that the vacuum and/or high pneumatic pressure is consistently and reliably applied to the pipe such that the carrier never becomes lost or stuck within the pipe. As such, one-way pneumatic delivery systems have heretofore been designed with individual pipes or ducts running from each initial location to the terminal location.

While existing one-way pneumatic delivery systems are effective for their intended purposes, such one-way pneumatic delivery systems have not, however, been without limitation. For instance, the use of individual tubes running from each initial location to the terminal location results in a significant number of tubes disposed at the terminal location, each of which extends only to a single initial location. Such a quantity of tubes at the receiving location is typically cumbersome and requires significant space. Each such tube must be concealed behind a wall, ceiling, or other such structure, with such concealment needing to be performed in conjunction with the concealment of electrical wiring, communication systems, plumbing systems, and heating systems, as well as other materials that must be disposed behind walls and above ceilings such as insulation and lighting structures. As such, the concealment of such numerous pipes is expensive and must compete for concealment space with other necessary structures. Moreover, the cost of such quantities of pipe and the labor required to conceal it can be prohibitive. Still further, a relatively large vacuum source and/or compressed air source must be provided to supply a vacuum and/or high pneumatic pressure to one or more of the pneumatic tubes simultaneously. The size of such vacuum and/or high pressure systems is dictated by the number of tubes extending between the initial location and the terminal location, the distance between the initial locations and the terminal location, as well as the weight of the container that is being delivered through each of the tubes. It is thus desired to provide an improved one-way pneumatic delivery system that eliminates the need for individual tubes to run from each initial location to the terminal location and that can employ a relatively smaller power unit to pneumatically drive the container from the initial location to the terminal location.

SUMMARY OF THE INVENTION

In view of the foregoing, an objective of the present invention is to provide an improved one-way pneumatic delivery system that employs a duct system extending from a plurality of initial locations to a common terminal location and having a plurality of branches that are connected with a single trunk line.

Another objective of the present invention is to provide such a system wherein a sending unit is provided at each initial location; each sending unit including a door that is selectively lockable to prevent fluid communication through the sending unit into the duct system.

Another objective of the present invention is to provide such a system wherein a receiving unit is provided at the common terminal location; the receiving unit including an access door that provides access to a reception cavity formed in the receiving unit—the access door being selectively lockable to prevent fluid communication therethrough and into the duct system.

Another objective of the present invention is to provide such a system wherein a power unit is pneumatically connected with the duct system to provide a vacuum to the duct system for pneumatically moving a carrier from any one of the initial locations to the terminal location.

Another objective of the present invention is to provide such a system wherein the power unit additionally provides a braking system that reduces the ejection velocity of the carrier at the terminal location.

Another objective of the present invention is to provide such a system wherein the power unit is detachable from the receiving unit.

Another objective of the present invention is to provide such a system wherein the duct system employs pipe sections that are of an outer diameter that can be concealed within walls that are built with conventional two-by-four (2×4) construction methodology.

Another objective of the present invention is to provide such a system wherein the sending units and the receiving units are operatively interconnected such that the insertion of a carrier into one of the sending units causes the doors of the other sending units and the receiving unit to become locked and prevent fluid communication therethrough and into the duct system.

Another objective of the present invention is to provide such a system wherein the duct system employs a single trunk line extending to the terminal location and a plurality of branches that each extend to one of the initial locations.

These and other objectives of the invention are achieved by a system adapted to move a carrier from one of a plurality of initial locations to a common terminal location; the carrier having a length; the system including a plurality of first sending units, each first sending unit defining one of the initial locations; a receiving unit disposed at the common terminal location; and a first duct system extending from each of the first sending units to the receiving unit; the first duct system adapted to allow a carrier to be moved from any one of the first sending units to the receiving unit.

BRIEF DESCRIPTION OF THE DRAWINGS

The preferred embodiments of the invention, illustrative of the best modes in which Applicant has contemplated applying the principles of invention, are set forth in the following description and are shown in the drawings and are particularly and distinctly pointed out and set forth in the appended claims.

FIG. 5 is a sectional side view of the power unit component of the first embodiment depicting the carrier initially entering the braking tube and disposed above both the upper and lower pillow openings;

FIG. 7 is a sectional view taken along line 7—7 of FIG. 6;

FIG. 8 is a view similar to FIG. 7, except depicting the access door in an open position;

Similar numerals refer to similar parts throughout the specification.

DESCRIPTION OF THE PREFERRED EMBODIMENTS

The pneumatic delivery system of the present invention is indicated generally by the numeral 2 in the accompanying figures. System 2 may be assembled in numerous configurations and may be employed in a variety of applications wherein a user desires to deliver small packages or bundles from a plurality of initial locations to a common terminal location. Pneumatic delivery system 2 may be installed in indoor applications, outdoor applications, as well as combinations of indoor and outdoor applications, such as combined applications wherein portions of system 2 are installed indoors and other portions are installed outdoors, as well as systems extending between detached buildings.

Figure 2:
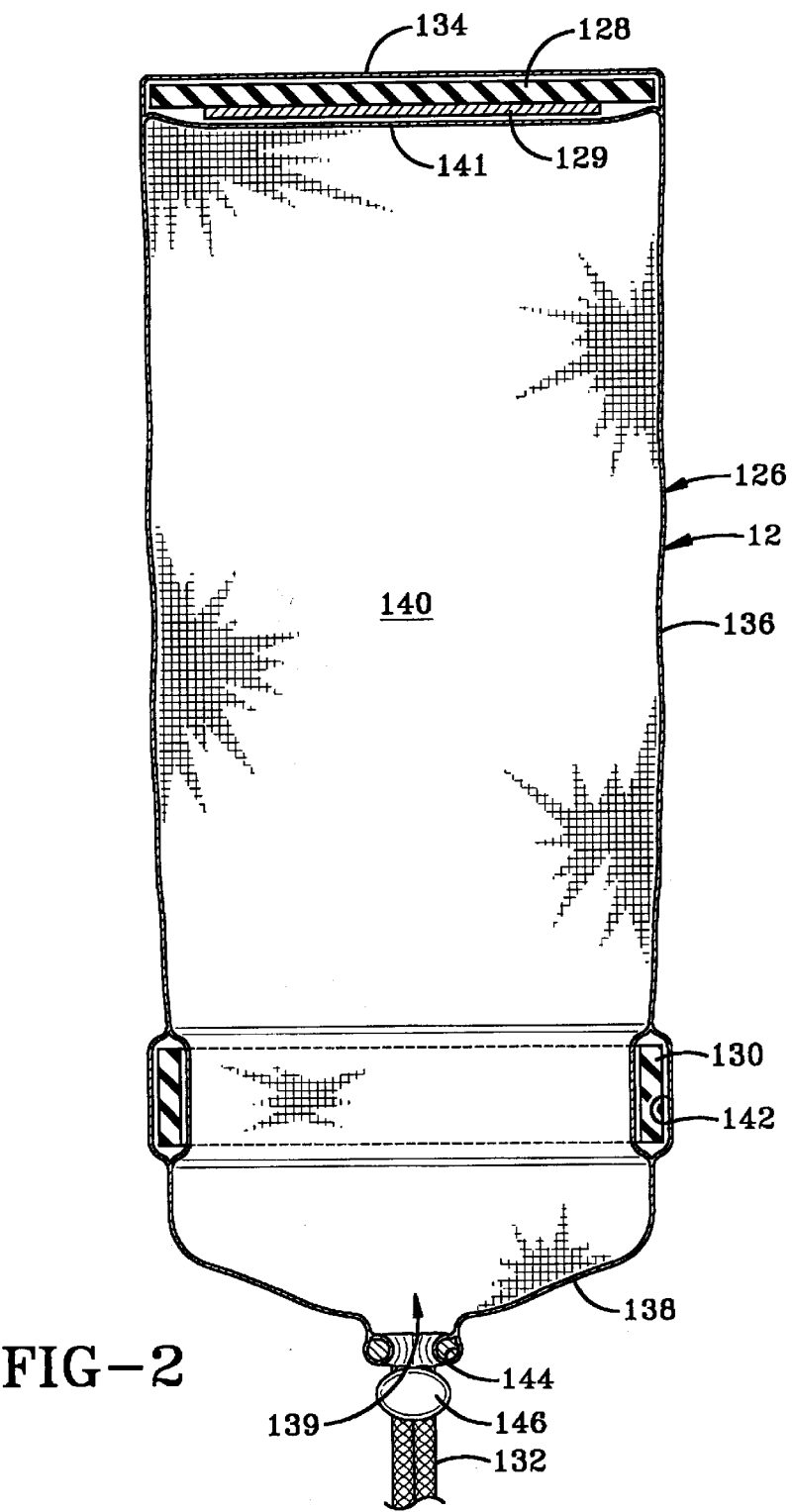
FIG. 2 is a sectional front view of the carrier of the present invention.

System 2 includes a plurality of sending units 4, a receiving unit 6, a duct system 8, a pair of power units 10, and at least a first carrier 12 (FIG. 2). Sending units 4 are each disposed at one of the initial locations. Receiving unit 6 is disposed at the terminal location. Duct system 8 includes a plurality of interconnected pipes, as will be set forth more fully below, that provide one-way fluid communication from each of sending units 4 to receiving unit 6. Power units 10 apply a reduced fluid pressure or vacuum to duct system 8 to pneumatically transfer carrier 12 from one of the initial locations to the terminal location. It is understood, however, that in other configurations, power units 8 may additionally or alternatively provide an increased fluid pressure, i.e., a fluid pressure in excess of ambient pressure, to assist in transferring carrier 12 through duct system 8.

As indicated hereinbefore, each of sending units 4 is disposed at one of the initial locations from which it is desired to transfer carrier 12 to receiving unit 6 disposed at the terminal location. Each sending unit 4 includes a sending unit housing 16, an insertion door 18, a sending locking mechanism 20, and a sending switch 22. While it is preferred that sending units 4 are fixedly mounted on substantially immovable vertical structures such as walls, pillars, and the like, other mounting systems can be employed without departing from the spirit of the present invention.

Figure 3:
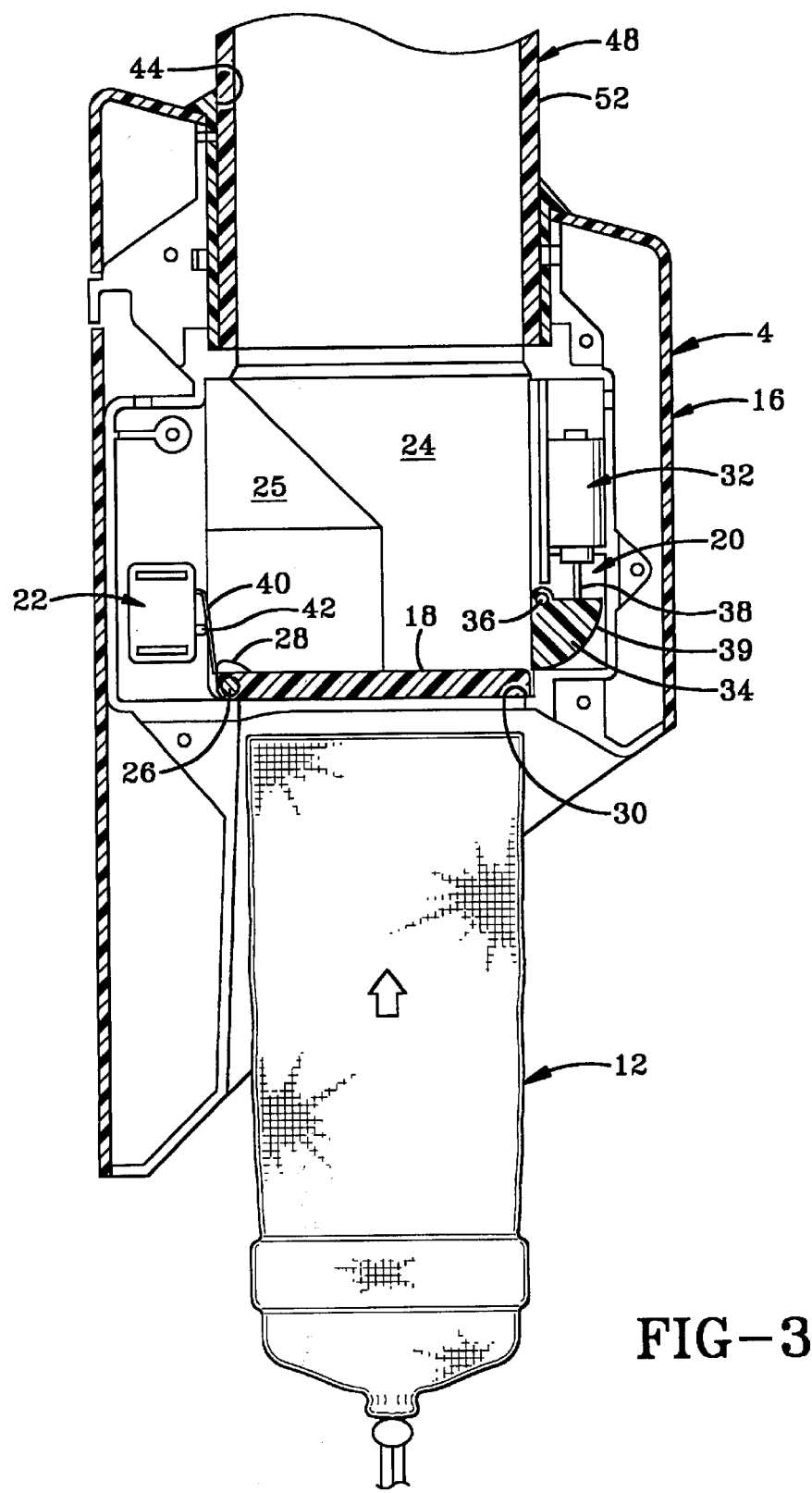
FIG. 3 is a sectional side view of a first sending unit immediately prior to the insertion of the carrier therein.
Figure 3A:
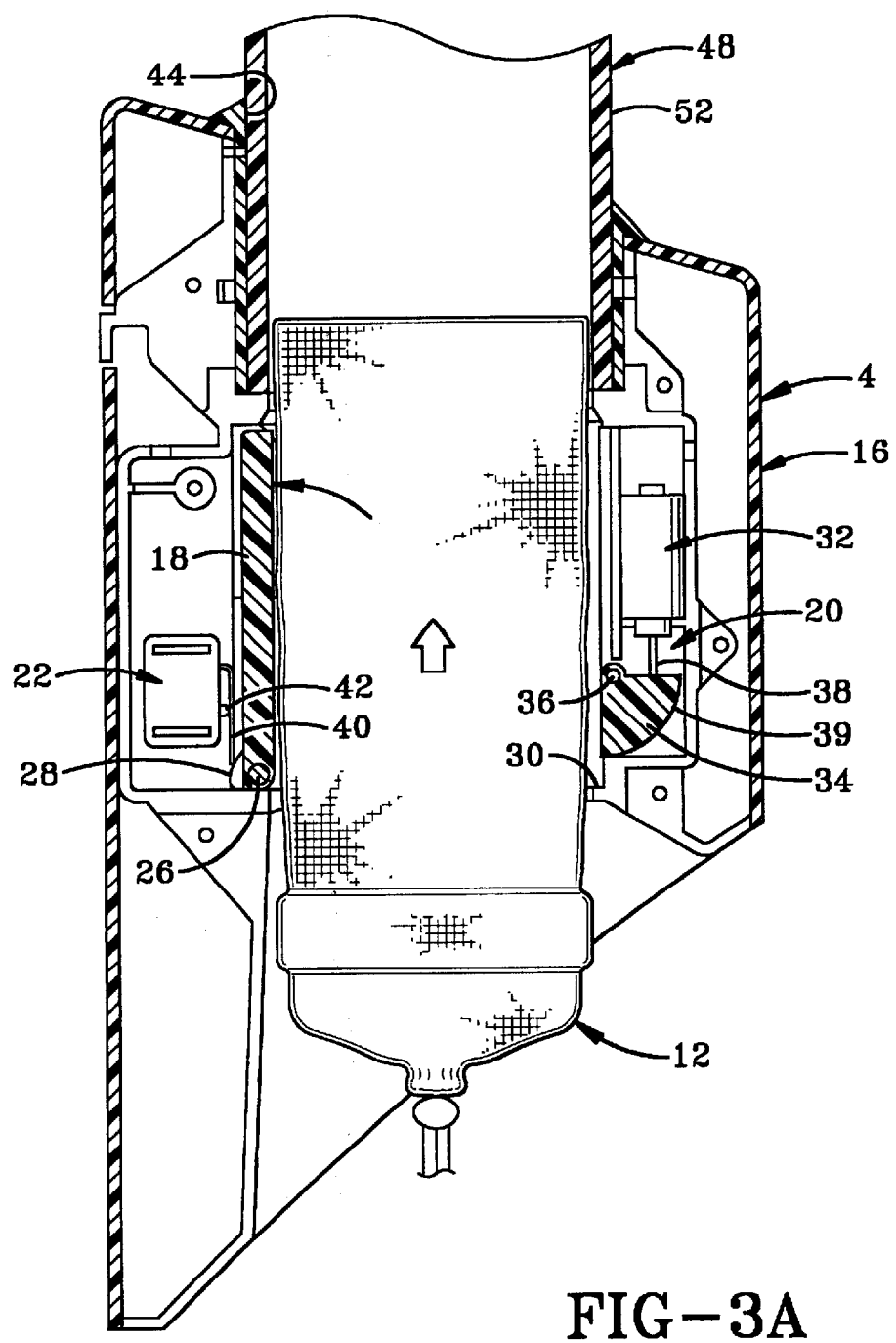
FIG. 3A is a view similar to FIG. 3, except showing the carrier inserted into the first sending unit.

Sending unit housing 16 is formed with a substantially cylindrical insertion opening 24. As will be set forth more fully below, insertion door 18 is pivotably mounted on sending unit housing 16 and is disposed inside insertion opening 24. More specifically, insertion door 18 is movable between a sealed position (FIG. 3) and a delivery position (FIG. 3A). Carrier 12 is preferably of a flexible, substantially cylindrical configuration, as will be set forth more fully below. As such, insertion opening 24 is sized and configured to slidably receive carrier 12 when insertion door 18 is in the delivery position. Inasmuch as insertion door 18 is disposed within insertion opening 24, an appropriately sized relief cutout 25 is formed in sending unit housing 16 contiguous with insertion opening 24 to permit insertion door 18, when in the delivery position, to be adjacent (FIG. 3A) carrier 12 during insertion through insertion opening 24.

Insertion door 18 is pivotably mounted on sending unit housing 16 within insertion opening 24. Insertion door 18 includes a substantially cylindrical pivot hub 26 protruding from opposite sides of insertion door 18 at one end and a switching cam 28 protruding from an upper surface of insertion door 18 at the end adjacent pivot hub 26. Sending unit housing 16 is formed with a pair of axially disposed cylindrical holes that pivotably receive pivot hubs 26 of insertion door 18. Insertion door 18 thus pivots on pivots hubs 26 between the sealed and delivery positions. Switching cam 28 is disposed on insertion door 18 and moves therewith for purposes to be set forth more fully below.

Sending unit housing 16 additionally includes an annular sealing stop 30 (FIG. 3A) protruding inwardly into insertion opening 24. Insertion door 18 is sealingly disposed against an upper surface of sealing stop 30 when in the sealed position (FIG. 3). Insertion door 18 is preferably disposed flush against the upper surface of sealing stop 30 when in the sealed position to prevent the flow of air or other fluid from the exterior of sending unit 4 into insertion opening 24 for purposes to be set forth more fully below. In this regard, the seal between insertion door 18 and sealing stop 30 can be augmented by an elastomeric or other seal interposed between sealing stop 30 and insertion door 18 when insertion door 18 is in the sealed position without departing from the spirit of the present invention.

Figure 4:
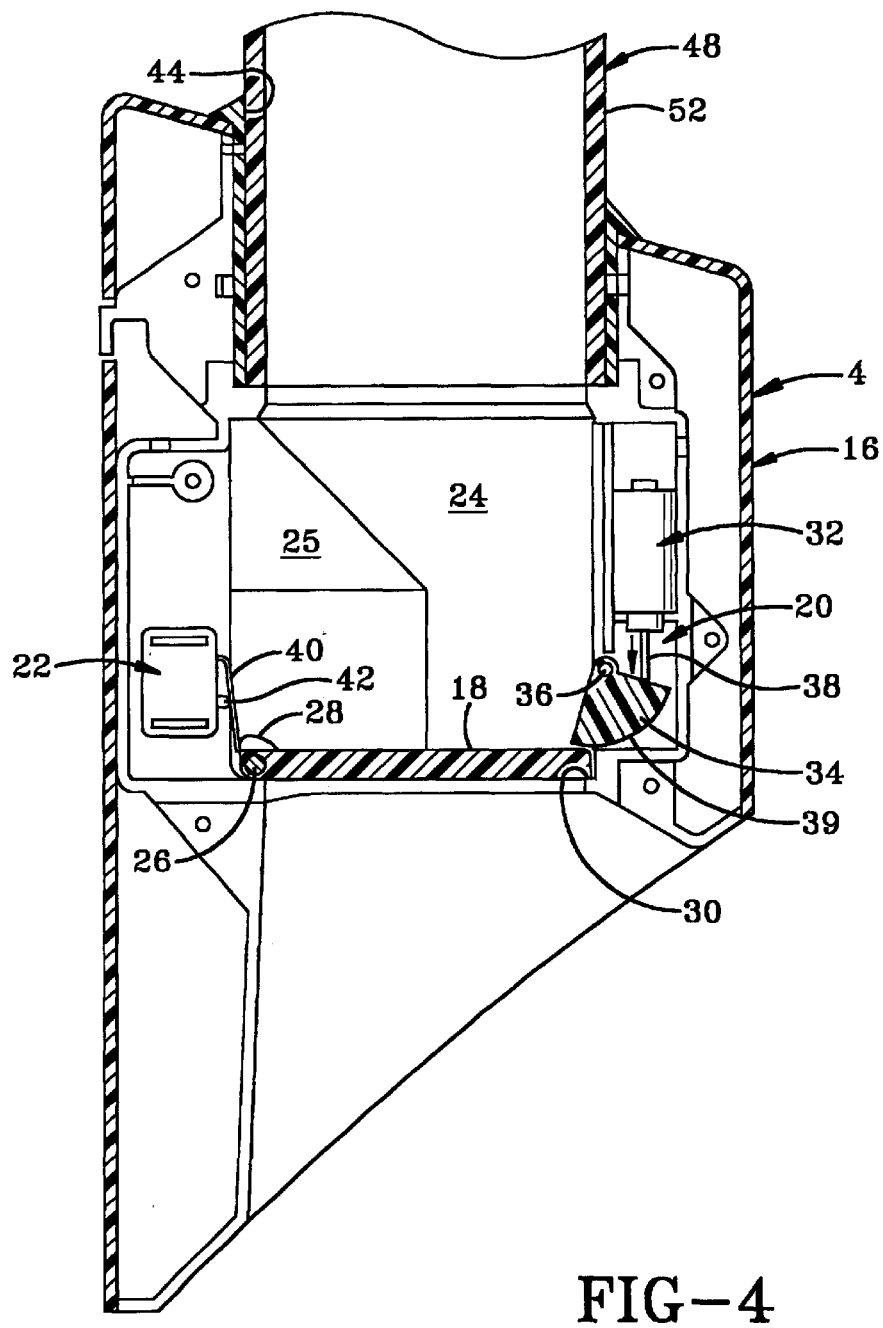
FIG. 4 is a sectional side view of a second sending unit showing the insertion door of the second sending unit locked in a sealed position.

Sending locking mechanism 20 includes a solenoid 32, a locking cam 34, and a pivot pin 36. Solenoid 32 is a conventional solenoid of the type known and understood in the relevant art that is electrically operable between a de-energized condition (FIG. 3) and an energized condition (FIG. 4). Solenoid 32 includes a plunger 38 that extends farther outward from solenoid 32 when solenoid 32 is in an energized condition.

Locking cam 34 is wedge-shaped is pivotally mounted at its apex on pivot pin 36 and includes an arcuate locking surface 39 opposite pivot pin 36. Locking cam 34 is operatively connected with plunger 38 of solenoid 32. When solenoid 32 is in the de-energized position (FIGS. 3 and 3A), locking cam 34 is out of mechanical interference with the movement of insertion door 18 between the sealed and delivery positions. When, however, solenoid 32 becomes energized, plunger 38 translates longitudinally farther outward from solenoid 32, which causes locking cam 34 to pivot about pivot pin 36 and into insertion opening 24 (FIG. 4). It can be seen, therefore, that when sending locking mechanism 20 is in a de-energized condition, insertion door 18 is freely movable between the sealed and delivery positions. When insertion door 18 is in the sealed position and when sending locking mechanism 20 becomes energized, however, locking surface 39 of locking cam 34 is disposed flush against an upper surface of insertion door 18 which prevents movement of insertion door 18 from the sealed position to the delivery position. Sending locking mechanism 20 thus selectively retains insertion door 18 in the sealed position and prevents the flow of air or other fluid past insertion door 18 and into insertion opening 24 for purposes to be set forth more fully below.

Sending switch 22 is a conventional switch of the type known and understood in the relevant art and includes a spring tang 40 and a button 42, with spring tang 40 protruding at least slightly into relief cutout 25. Spring tang 40 extends outwardly from sending switch 22 and extends over button 42 to a point of termination adjacent to switching cam 28 of insertion door 18. Sending switch 22 is configured such that when insertion door 18 is in the sealed position, button 42 is in an open position. More specifically, sending switch 22 includes at least a pair of electrical contacts that are in an unconnected or open position when button 42 is in the open position (FIGS. 3 and 4). When insertion door 18 moves from the sealed position to the delivery position, however, the pivoting movement of switching cam 28 in conjunction with the movement of insertion door 18 compresses spring tang 40 against button 42, thus moving button 42 into the closed position (FIG. 3A). The delivery position of insertion door 18 thus corresponds with the closed position of sending switch 22 and closing of the electrical contacts included therein.

Inasmuch as spring tang 40 is intended to be repeatedly compressed against sending switch 22 and released therefrom, it is preferred that spring tang 40 be manufactured of a material that is sufficiently strong, yet possesses a sufficient shape memory to consistently return from its compressed position (FIG. 3A) to its released position (FIGS. 3 and 4). It is understood that sending switch 22 may be of alternative configurations without departing from the spirit of the present invention.

Figure 1:
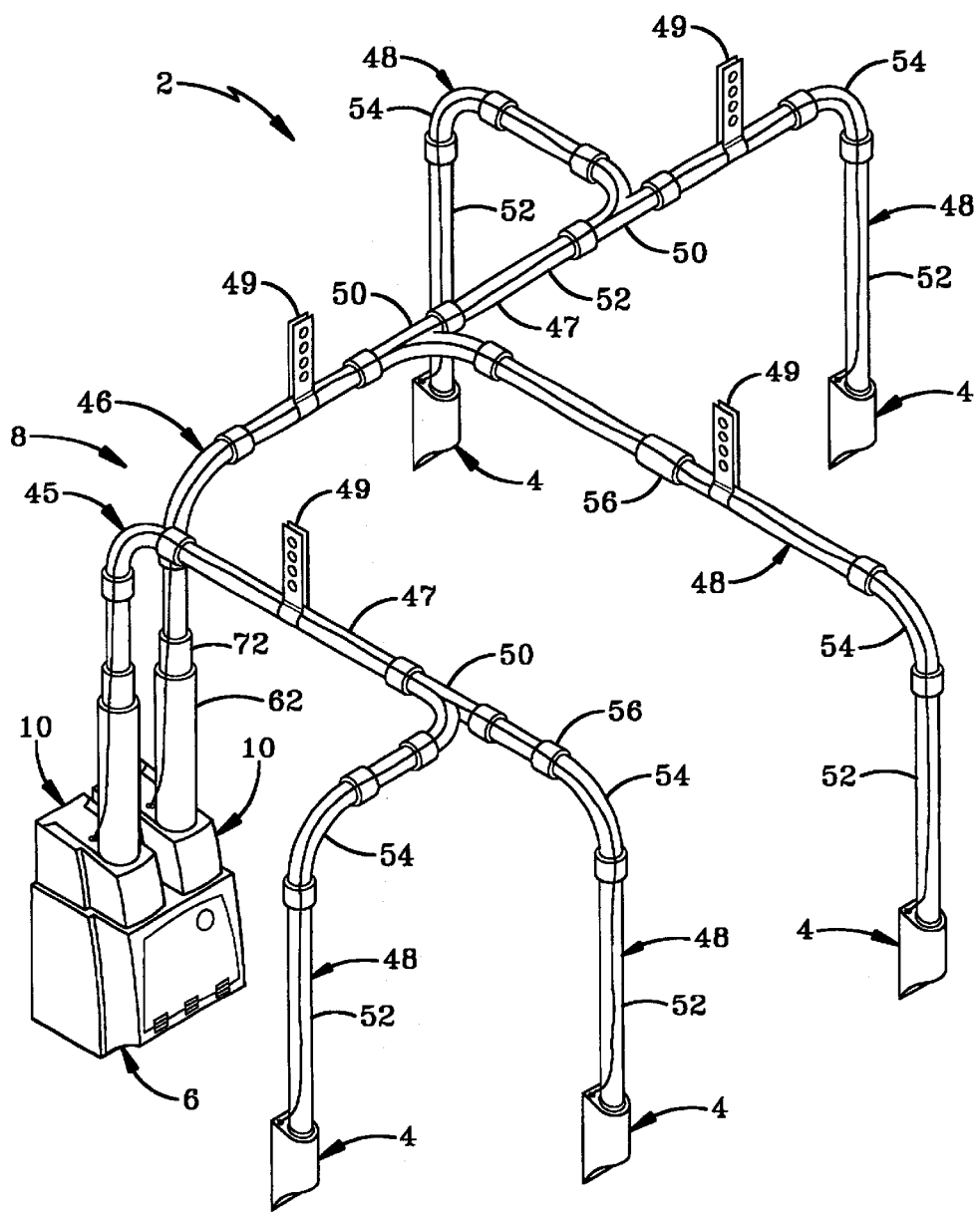
FIG. 1 is a perspective view of a first embodiment of the pneumatic delivery system of the present invention.

Sending unit housing 16 is additionally formed with a substantially cylindrical branch receptacle 44 at an upper end thereof that is configured to receive an end of duct system 8. In FIG. 1, duct system 8 is depicted as including a first duct system 45 and a second duct system 46. More specifically, first duct system 45 attaches two of sending units 4 with one of power units 10 and with receiving unit 6. Likewise, second duct system 46 connects three of sending units 4 with the other of power units 10 and with receiving unit 6. Both first and second duct systems 45 and 46 are manufactured out of interconnected sections of hollow pipe having a substantially circular cross section. The pipe sections used to construct first and second duct systems 45 and 46 may be manufactured out of any one of a wide variety of materials known and understood in the relevant art such as polyvinyl chloride (PVC), acrylonitrile butadiene styrene (ABS) and butyl acetate, although other materials may be used without departing from the spirit of the present invention. Inasmuch as conventional two-by-four (2×4) construction techniques involve the use of two-by-four (2×4) members that are approximately three and one-half inches in width, such that wallboard or drywall disposed on alternate edges of such two-by-fours (2×4's) are spaced approximately three and one-half inches apart, it is preferred that the pipes used to construct first and second duct systems 45 and 46 have an outer diameter of, at most, three and one-half inches to permit the pipes to be easily installed within walls. It is understood, however, that wall constructions may vary in accordance with accepted construction practices, and the outer diameters of the pipes used to construct first and second duct systems 45 and 46 may vary accordingly.

First and second duct systems 45 and 46 each include a single trunk line 47 and a plurality of branches 48. Each trunk line 47 terminates at one of power units 10 which are in fluid communication with receiving unit 6. Branches 48 each terminate in branch receptacles 44 of sending units 4. Depending upon the lengths of trunk line 47 and branches 48, the relative rigidity of the pipes used to construct first and second duct systems 45 and 46, as well as other factors, trunk line 47 and/or branches 48 may each be hung by a hangar 49 attached thereto and connected onto an appropriate structural member such as a two-by-four, a ceiling rafter or other appropriate structure.

First and second duct systems 45 and 46 are each constructed from one or more Y-shaped tubing sections 50, straight tubing sections 52, and sweeping elbow tubing sections 54. As indicated hereinbefore, first and second duct systems 45 and 46 may be of numerous types of different configurations depending upon the needs of the particular application. As such, the particular configuration of first and second duct systems 45 and 46 depicted in FIG. 1 is not intended in any fashion to limit the advantages or disclosure of the invention presented here. The particular combination of Y-shaped tubing sections 50, straight tubing sections 52, and sweeping elbow tubing sections 54 may be varied to provide branches 48 at desired initial locations and to provide trunk line 47 at the desired terminal location.

As is best shown in FIG. 1, trunk lines 47 extend from power units 10 and through one or more Y-shaped tubing sections 50. Branches 48 extend between one of Y-shaped tubing sections 50 and one of sending units 4. As such, the portions of first and second duct systems 45 and 46 that do not extend between one of Y-shaped tubing sections 50 and one of sending units 4 is considered trunk line 47.

As is understood in the relevant art, Y-shaped tubing sections 50, straight tubing sections 52, and sweeping elbow tubing sections 54 are interconnected with one another in the desired configuration with an appropriate coupling 56 extending across and coupling adjacent tubing sections. As is understood in the relevant art, however, the tubing sections employed to construct first and second duct systems may be standard duct sections that are each formed with a flared receptacle in the upstream direction that can receive the next consecutive tubing section therein. The use of standard tubing sections thus largely eliminates the need for couplings 56 inasmuch as such standard tubing sections already include coupling structures incorporated therein. While the use of standard tubing sections is preferred to simplify installation of system 2, the use of either standard tubing sections or conventional tubing sections with couplings 56 does not affect the concept of the present invention.

Power units 10 each include a vacuum source 58, a braking tube 60, and a vacuum jacket 62. As is best shown in FIG. 1, one of power units 10 is operatively connected with each of first and second duct systems 45 and 46. Power units 10 not only apply a vacuum or reduced fluid pressure to first and second duct systems 45 and 46, but also perform a braking function that reduces the velocity of carriers 12 when exiting power units 10.

Figure 5A:
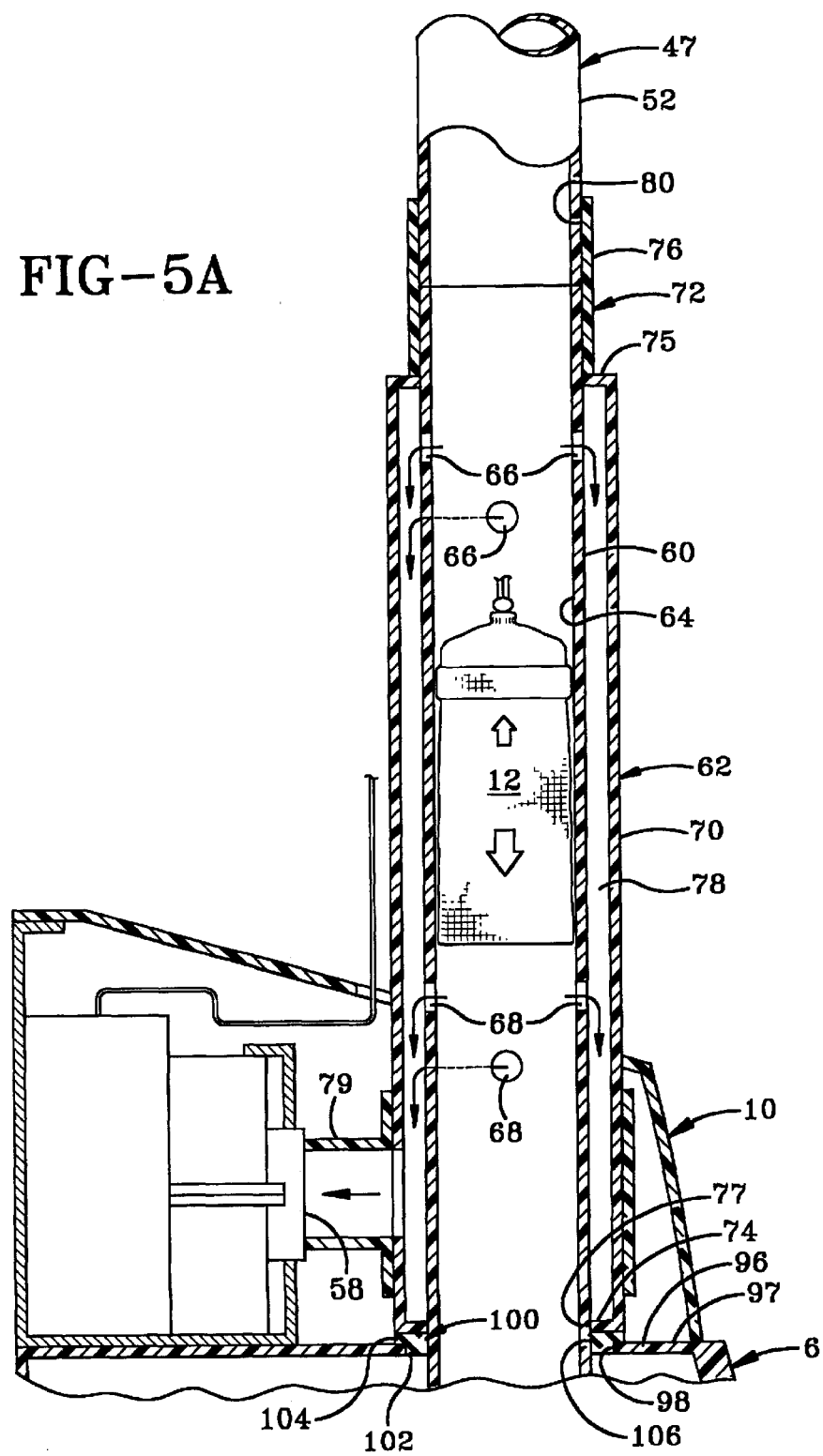
FIG. 5A is a view similar to FIG. 5, except depicting the carrier disposed in the braking tube between the upper and lower pillow openings.
Figure 5B:
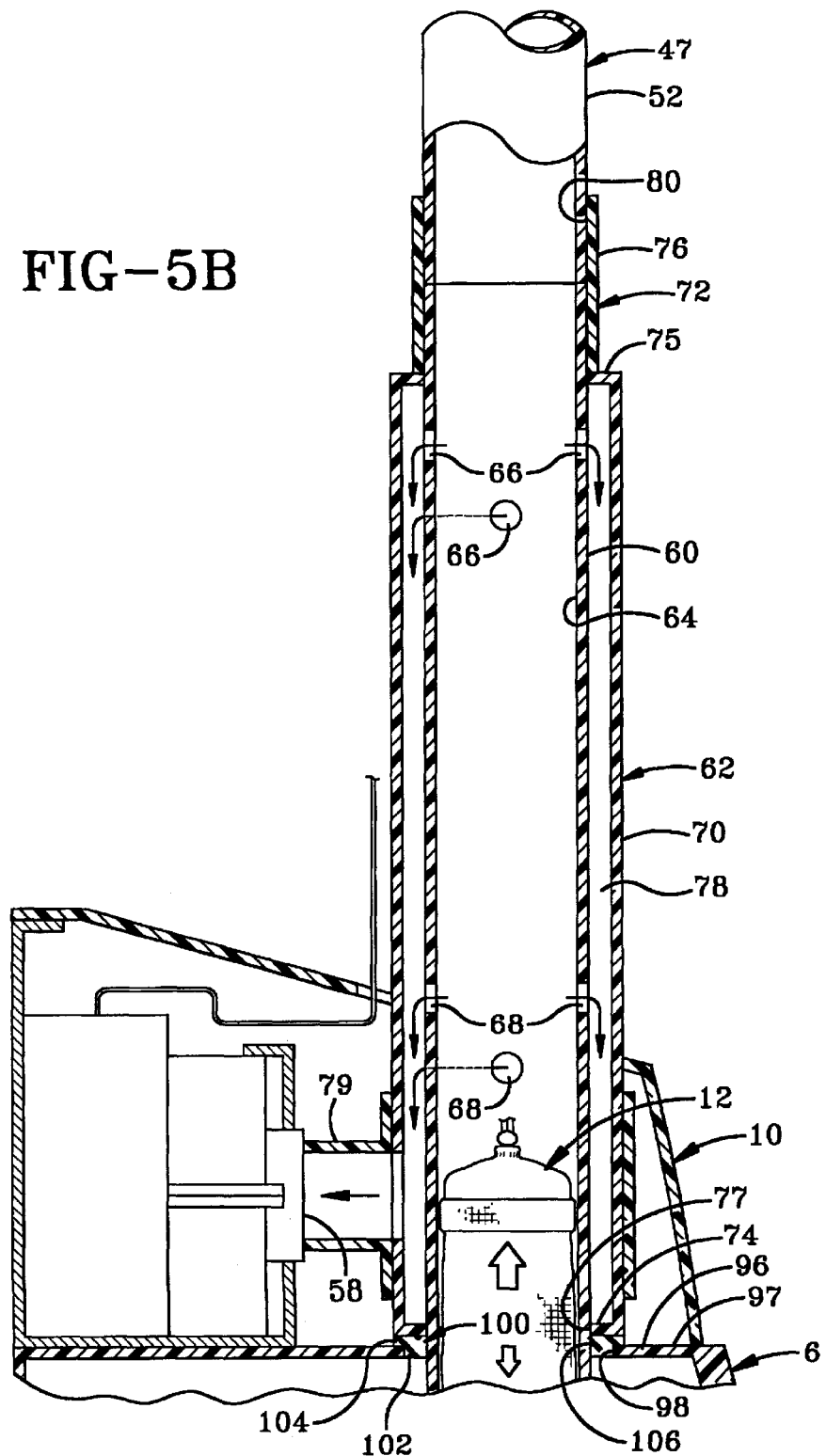
FIG. 5B is a view similar to FIG. 5, except depicting the carrier disposed in the braking tube below the upper and lower pillow openings.

As is shown in FIGS. 5–5B, braking tube 60 and vacuum jacket 62 form an elongated, axially aligned assembly of hollow tubes in fluid communication with vacuum source 58. Braking tube 60 is a hollow, elongated tube having substantially comparable cross sectional dimensions with straight tubing sections 52 to facilitate the travel of carriers 12 from first and second duct systems 45 and 46 through braking tube 60 without mechanical interference or obstruction.

Braking tube 60 is formed with an elongated cylindrical braking channel 64 extending longitudinally therethrough. Braking tube 60 is also formed with a plurality of upper pillow openings 66 and a plurality of lower pillow openings 68, with upper and lower pillow openings 66 and 68 extending radially through braking tube 60 and in fluid communication with braking channel 64. Braking channel 64 is of a circular cross section that is complementally sized and shaped to accommodate carrier 12 with minimal clearance and air leakage, but may be of other cross sections corresponding with different carriers 12 without departing from the spirit of the present invention. Upper and lower pillow openings 66 and 68 are of a substantially circular cross section, but may be of other non-circular cross sections without affecting the concept of the present invention.

Vacuum jacket 62 includes an elongated hollow cylindrical main tube 70, a nipple 72, and a base plate 74. The inner diameter of main tube 70 is greater than the outer diameter of braking tube 60 such that when braking tube 60 is axially disposed within main tube 70, an elongated annular vacuum channel 78 is defined therebetween. Vacuum channel 78 is in fluid communication with braking channel 64 through upper and lower pillow openings 66 and 68. Vacuum channel 78 is also in fluid communication with vacuum source 58 through a suction tube 79. It can be seen, therefore, that the generation of a vacuum or a reduced fluid pressure in vacuum source 58 is in fluid communication with braking channel 64 by way of suction tube 79, vacuum channel 78, and upper and lower pillow openings 66 and 68. In this regard, nipple 72 and base plate 74 are provided at the upper and lower ends, respectively, of vacuum jacket 62 to prevent fluid communication between the vacuum generated by vacuum source 58 and the atmosphere through the ends of vacuum jacket 62.

More specifically, nipple 72 includes an annular flange 75 and an elongated, hollow cylindrical barrel 76. Flange 75 sealingly extends between barrel 76 and the upper end of vacuum jacket 62. Barrel 76 extends longitudinally upwardly from flange 75, with the inner arcuate surface of barrel 76 being disposed flush against the outer surface of the upper end of braking tube 60. It is preferred that barrel 76 be sealed against braking tube 60 with appropriate sealants and/or adhesive to prevent any air leakage. It is further preferred that barrel 76 extend upwardly beyond the upper end of braking tube 60 to provide a cylindrical trunk receptacle 80 along the inner arcuate surface thereof that is sized and shaped to sealingly receive an end of trunk line 47 therein. As is shown in FIGS. 5–5B, when trunk line 47 is connected with power unit 10, the end of trunk line 47 and the upper end of braking tube 60 are both abuttingly disposed within barrel 76.

Base plate 74 is an annular section of material formed with a substantially circular hole 77 that is sealingly disposed between the lower end of vacuum jacket 62 and braking tube 60. The lower end of braking tube 60 extends through and downwardly from hole 77 in base plate 74 and is sealingly attached thereto to prevent any leakage of air therebetween.

Nipple 72 and base plate 74 thus sealingly connect the ends of main tube 70 with braking tube 62. As a result, substantially all of the vacuum generated by vacuum source 58 is applied to upper and lower pillow openings 66 and 68.

Upper pillow openings 66 include three holes of substantially the same size that are circumferentially spaced from one another about braking tube 60 in approximately the same region thereof. While it is preferred that upper pillow openings 66 are substantially evenly circumferentially spaced apart, departures from such equal circumferential spacing do not affect the concept of the present invention. Likewise, at least one of upper pillow openings 66 is depicted as being longitudinally spaced from the other upper pillow openings 66. While such nominal longitudinal spacing is preferred to reasons to be set forth more fully below, upper pillow openings 66 can be longitudinally unspaced and rather be circumferentially distributed about a single longitudinal point along braking tube 60 without departing from the spirit of the present invention.

Lower pillow openings 68 are depicted as being arranged similarly to upper pillow openings 66. Lower pillow openings 68 may be positioned differently than upper pillow openings 66, and may additionally be longitudinally unspaced or spaced at different circumferential distances apart from one another without departing from the spirit of the present invention. It can be seen, however, that both upper and lower pillow openings 66 and 68 are longitudinally spaced from the opening of suction tube 79 into vacuum jacket 62. Such longitudinal spacing is preferred to limit the likelihood that a finger or a foreign object might be inserted through one of upper or lower pillow openings 66 and 68 through suction tube 79 and into vacuum source 58. Such longitudinal spacing thus serves as a safety feature and prevents the function of power units 10 from being impaired due to insertion of foreign objects into vacuum source 58.

The vacuum or reduced fluid pressure generated by vacuum source 58 is in fluid communication through suction tube 79, vacuum channel 78, and upper and lower pillow openings 66 and 68 with braking channel 64. Inasmuch as trunk line 47 is disposed in trunk receptacle 80 of main tube 70 and is sealed therein, vacuum source 58 likewise applies a vacuum or reduced pressure to trunk line 57 through upper and lower pillow openings 66 and 68. The application of such a vacuum to trunk line 47 pneumatically pulls carrier 12 from one of sending units 4 through duct system 8 toward power unit 10, as will be set forth more fully below.

When carrier 12 is traveling through trunk line 47 and is entering braking tube 60 of power unit 10 (FIG. 5) the vacuum delivered through upper and lower pillow openings 66 and 68 together apply a single reduced pressure to the lower or leading surface of carrier 12. When, however, carrier 12 has progressed through braking channel 64 to a point intermediate upper and lower pillow openings 66 and 68 (FIG. 5A), lower pillow openings 68 continue to apply a reduced fluid pressure to the lower or leading surface of carrier 12, but upper pillow openings 66 apply a reduced fluid pressure to the upper or trailing end of carrier 12. The two reduced fluid pressures thus exert suction forces in opposite directions on carrier 12. The application of a suction force by upper pillow openings 66 which acts in a direction opposite the direction in which carrier 12 is traveling at least nominally reduces the velocity of carrier 12. Moreover, once carrier 12 has proceeded through braking channel 64 beyond lower pillow openings 68, upper and lower pillow openings 66 and 68 both apply a reduced fluid pressure to the upper or trailing end of carrier 12, which has the effect of further reducing the velocity of carrier 12 in the direction toward receiving unit 6. In this regard, the configuration of power units 10 produces a vacuum dynamic that is sufficiently powerful to draw carrier 12 through duct system 8 and to provide a two-stage velocity reduction to carrier 12 as it passes upper and lower pillow openings 66 and 68, yet does not overcome the effects of the momentum possessed by carrier 12 and the effect of gravity exerted thereon. As such, power units 10 pneumatically draw carriers 12 through duct system 8 and reduce the velocity of carriers 12 prior to their exiting braking tube 60 into receiving unit 6.

Figure 6:
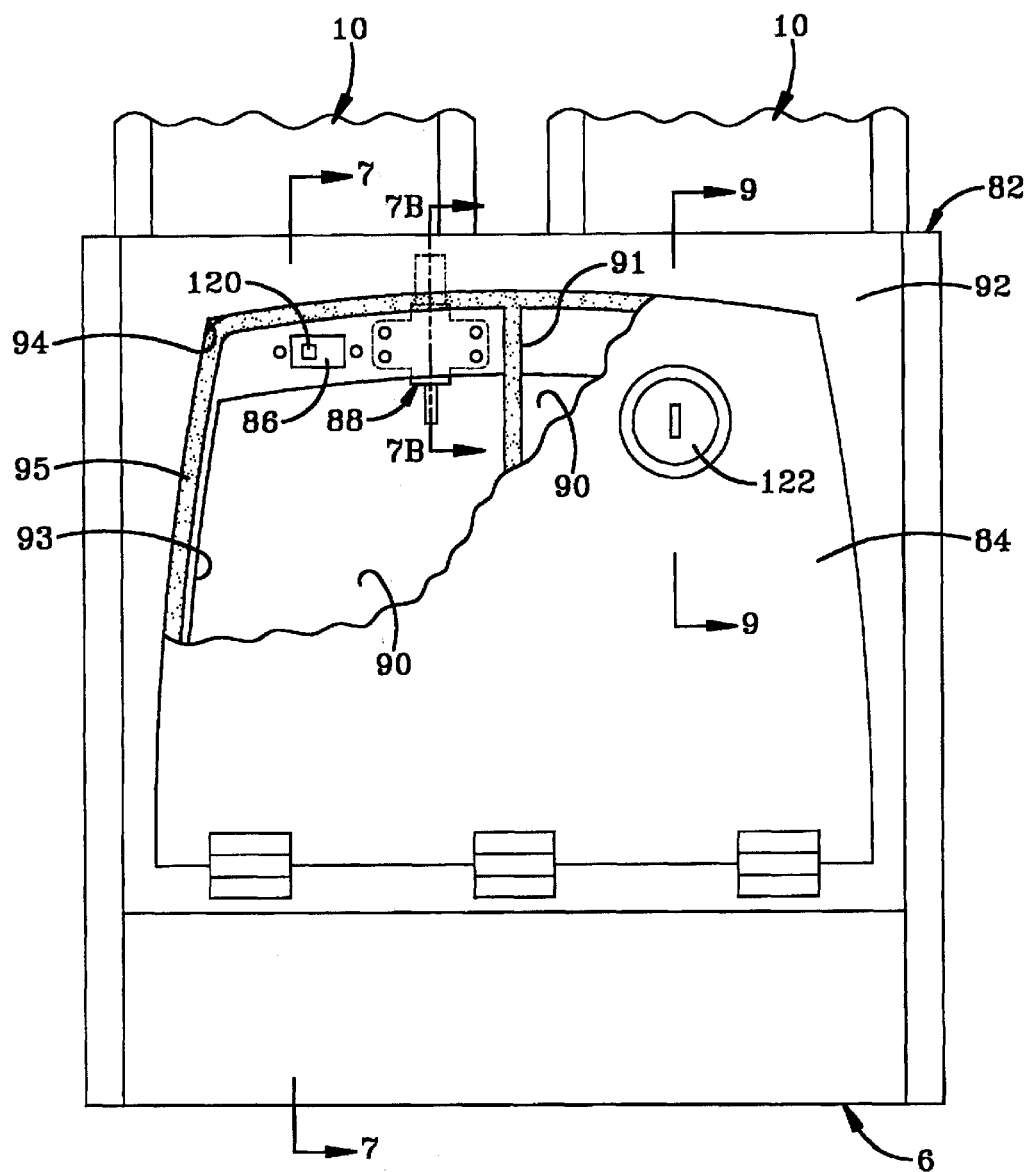
FIG. 6 is a front elevational view of the receiving unit component of the present invention depicting the access door partially cut away.
Figure 7A:
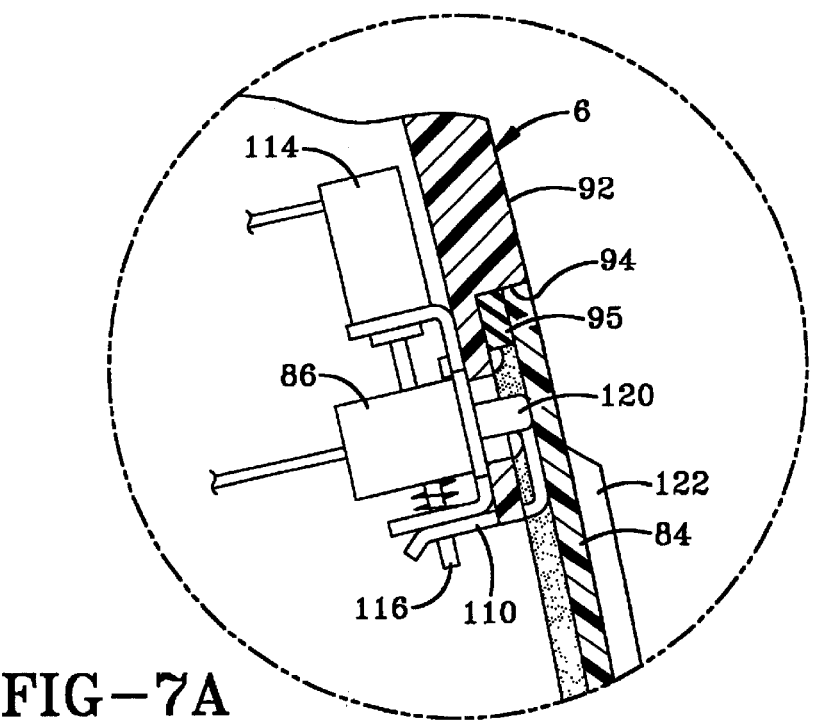
FIG. 7A is an enlarged view of the encircled portion of FIG. 7, wherein the button of the receiving unit is depicted in a closed position.
Figure 7B:
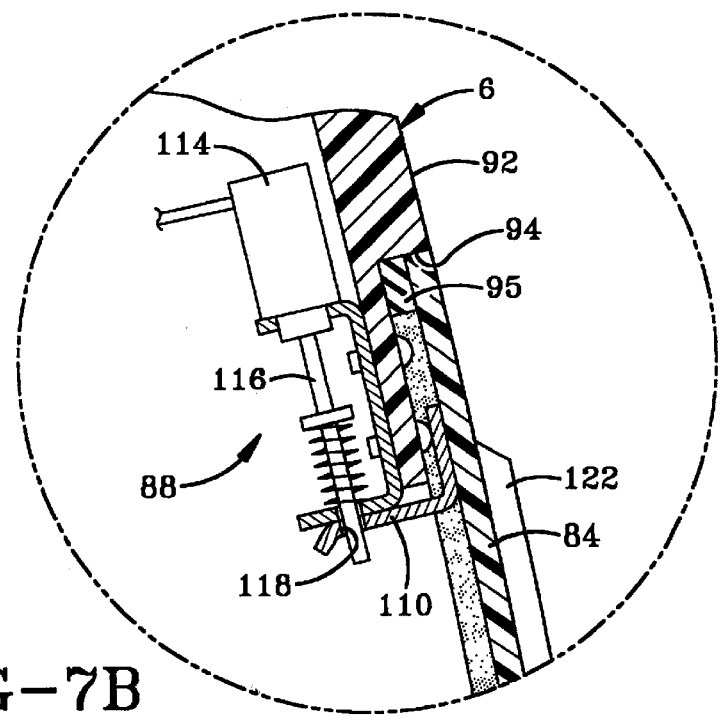
FIG. 7B is a sectional view as taken along line 7B—7B of FIG. 6 wherein the receiving solenoid is depicted in an energized position.
Figure 8A:
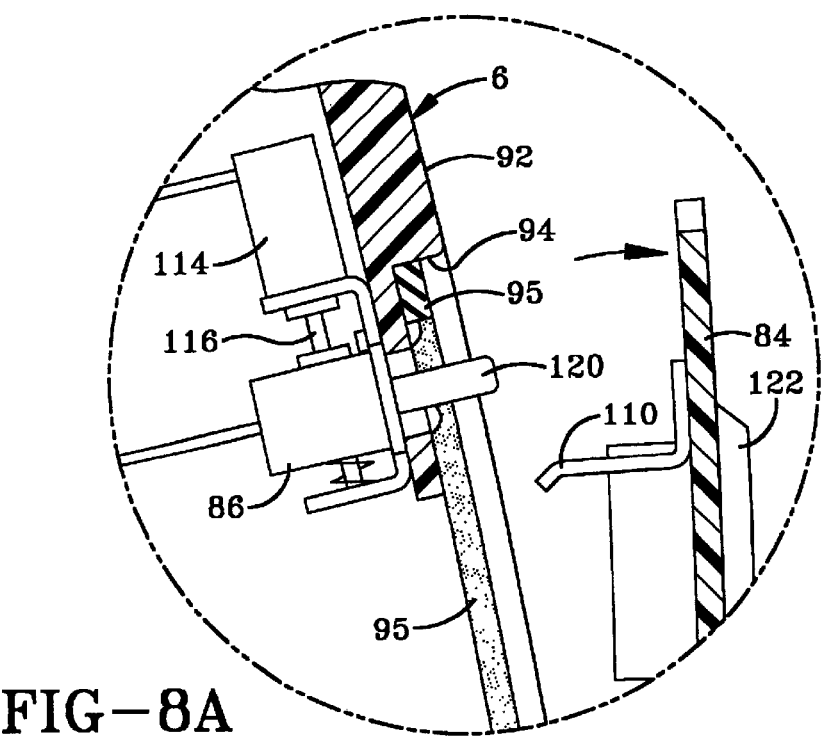
FIG. 8A is an enlarged view of the encircled portion of FIG. 8, and is similar to FIG. 7A except showing the button of the receiving unit in an open position.
Figure 8B:
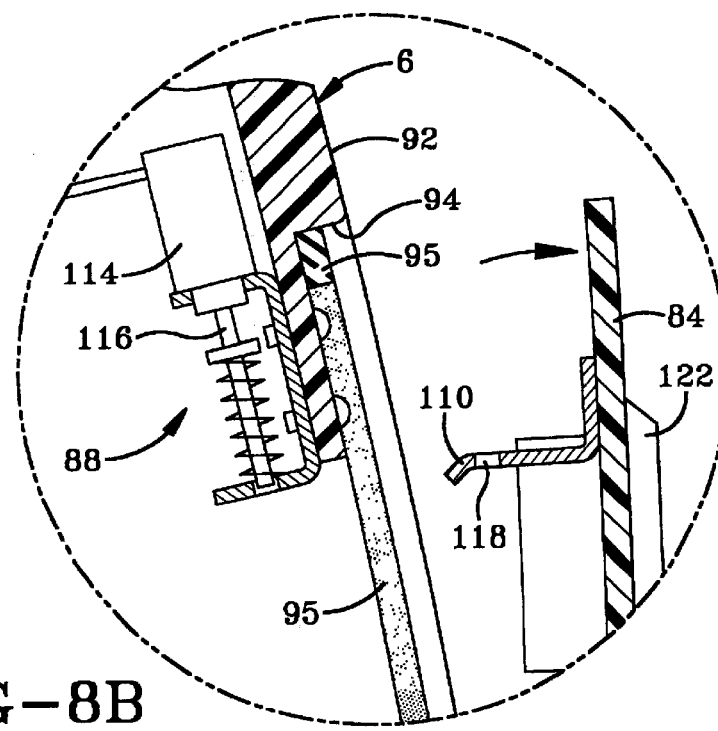
FIG. 8B is a view similar to FIG. 7B, except showing the receiving solenoid in a de-energized position.

As can be seen in FIG. 6, receiving unit 6 includes a receiving unit housing 82 having a hingedly and pivotably mounted access door 84, with a receiving switch 86 and a receiving locking mechanism 88 disposed on receiving unit housing 82 behind access door 84 (FIGS. 7A and 7B). Receiving unit housing 82 is formed with a pair of reception cavities 90 that are separated by a divider plate 91. More specifically, access door 84 is hingedly attached to a front plate 92 disposed at the front of receiving unit housing 82. Front plate 92 is formed with a removal opening 93 that provides access between the exterior of receiving unit housing 82 and reception cavities 90. Access door 84 is moveable between a closed position (FIGS. 6–7B) and an open position (FIGS. 8–8B). Access door 84 is disposed against receiving unit housing 82 when in the closed position, and is pivoted away from front plate 92 when in the open position.

The front surface of front plate 92 is recessed slightly to provide a door seat 94 in substantially the shape of access door 84 into which access door 84 is received when in the closed position. The frontmost edge of the divider plate 91 is configured to follow door seat 94. A seal 95 is disposed in door seat 94 and along the frontmost edge of divider plate 91 against which access door 84 is sealingly disposed when in the closed position, as will be set forth more fully below.

Receiving unit housing 82 additionally includes a top plate 96 (FIGS. 5–5B) at the uppermost end thereof having a substantially horizontal top surface 97. Power units 10 of system 2 are disposed against top surface 97. Top plate 96 is formed with a pair of substantially cylindrical delivery holes 98 extending therethrough that allow power units 10 be operatively connected in fluid communication with reception cavities 90. As is best shown in FIGS. 5–5B, the lowermost ends of braking tubes 60 extend downwardly through delivery holes 98 and into the associated reception cavity 90.

A grommet 100 is sealingly disposed between each delivery hole 98 and the braking tube 60 extending therethrough. Grommet 100 is a flexible or semi-flexible body that is manufactured out of a resilient material such as rubber or rubberized foam, although other appropriate sealing materials may be used without departing from the spirit of the present invention. Each grommet 100 includes a hollow, substantially cylindrical barrel 102 that is connected with an annular flange 104. The inner arcuate surface of barrel 102 provides an inner sealing surface 106 that is sealingly disposed against the arcuate outer surface of the lower end of braking tube 60. Flange 104 is sealingly interposed between top surface 97 and the lower surface of base plate 74. Likewise, barrel 102 is sealingly interposed between braking tube 60 and delivery hole 98. In accordance with the objectives of the present invention, grommets 100 seal braking tubes 60 within delivery holes 98 to prevent the leakage of air from the exterior of receiving unit housing 82 therethrough into reception cavities 90 when the vacuum or reduced fluid pressure is applied by vacuum source 58 to braking channel 64.

As is best shown in FIG. 7B, receiving locking mechanism 88 includes a locking plate 110 attached to access door 84 and a receiving solenoid 114. Locking plate 110 is attached to the surface of access door 84 in such a configuration that locking plate 110 protrudes into one of reception cavities 90 when access door 84 is in the closed position.

As is best shown in FIG. 6, receiving switch 86 and receiving solenoid 114 are attached side-by-side to front plate 92 of receiving unit housing 82 inside one of reception cavities 90. Receiving switch 86 includes a spring-loaded button 120 (FIGS. 7A and 8A) that is directed outwardly from front plate 92 toward access door 84. Button 120 is moveable between an open position (FIG. 8A) corresponding with the open position of access door 84 and a closed position (FIG. 7A) corresponding with the closed position of access door 84. The movement of button 120 between the open and closed positions operates electrical contacts disposed within receiving switch 86 that are in electrical communication with solenoids 32 of sending units 4. When button 120 is in the open position, each sending locking mechanism 20 is in the energized position, thus preventing carrier 12 from being inserted into any of sending units 4 when access door 84 is in the open position. Button 120 does not cause sending locking mechanisms 20 to be in the energized position when button 120 is in the closed position.

Receiving solenoid 114 is operable between an energized position (FIG. 7B) and a de-energized (FIG. 8B). In this regard, receiving solenoid 114 includes a plunger 116 protruding outwardly therefrom that extends longitudinally farther outward from receiving solenoid 114 when receiving solenoid 114 is in the energized position. Locking plate 110 is formed with a substantially circular hole 118 (FIG. 8B) extending therethrough that telescopingly receives plunger 116 when receiving solenoid 114 is in the energized position. The receipt of plunger 116 in hole 118 prevents the movement of access door 84 from the closed position to the open position. In this regard, it can be seen that plunger 116 can only engage hole 118 if access door 84 is in the closed position when receiving solenoid is operated from the de-energized position to the energized position. Nevertheless, inasmuch as sending locking mechanisms 20 are all in an energized condition when access door 84 is in an open condition such that insertion doors 18 are retained in the sealed position, none of sending switches 22 can be operated to the closed position to energize receiving solenoid 114 unless access door 84 is already in the closed position.

Access door 84 lies sealingly flush against seal 95 when in the closed position. The sealing attachment of access door 84 against seal 95 prevents the leakage of air from the exterior of receiving unit housing 82 into reception cavities 90, and the portion of seal 95 extending across the front edge of divider plate 91 prevents the leakage of fluid from one of reception cavities 90 to the other. Seal 95 thus facilitates the application of a vacuum or reduced fluid pressure to duct system 8 inasmuch as each braking channel 64 is in fluid communication with one of first and second duct systems 45 and 46 and one of reception cavities 90. More specifically, when a vacuum is applied to braking channel 64, the same vacuum is in fluid communication with first or second duct system 45 or 46 and one of reception cavities 90. Inasmuch as it is most particularly desired to pneumatically draw carrier 12 from one of branches 48 toward power unit 10, any leakage of air from the exterior of receiving unit housing 82 into braking channel 64 will correspondingly reduce the vacuum that is applied to carrier 12. It is thus preferred to minimize the leakage of air from the end of braking channel 64 that is in fluid communication with receiving unit 6 by providing both seal 95 and grommets 100 to ensure that the maximum vacuum or reduced fluid pressure is applied to carrier 12 to draw it through duct system 8.

Figure 9:
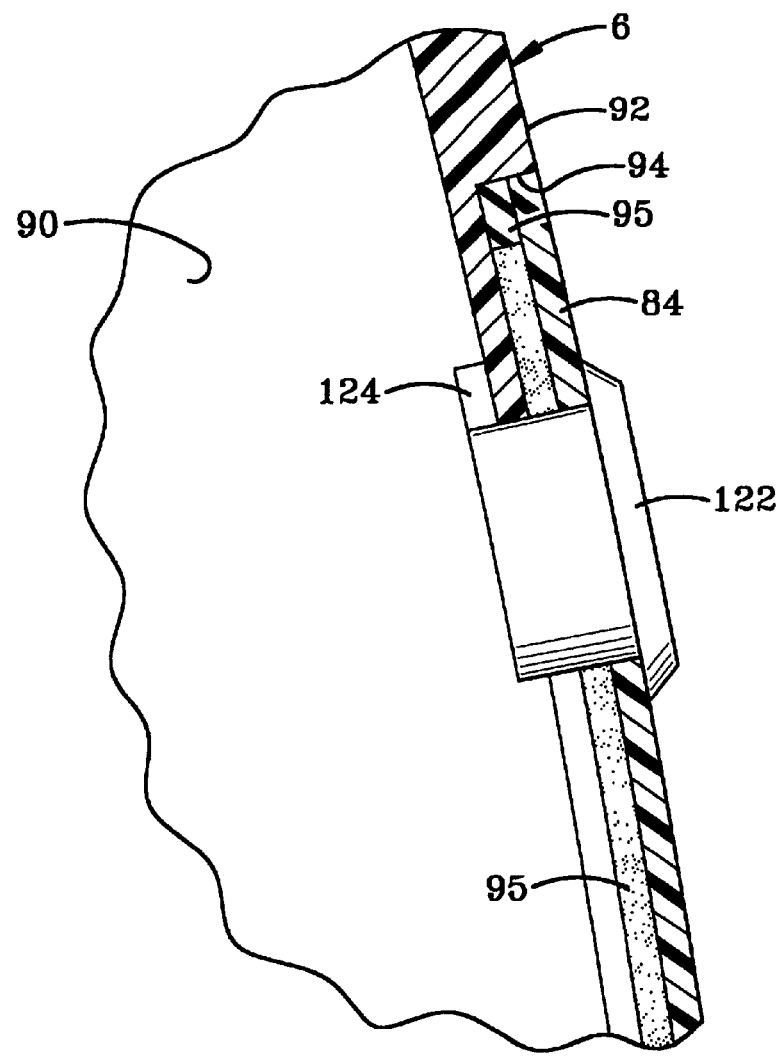
FIG. 9 is a sectional view taken along line 9—9 of FIG. 6.

As is best shown in FIGS. 6 and 9, a lock 122 is disposed in a hole formed in access door 84 near the upper end thereof. Lock 122 includes a lock cylinder of the type known and understood in the relevant art that can be operated with an appropriate key. Lock 122 operates a bolt 124 that selectively protrudes upwardly from an outer surface thereof to selectively retain access door 84 in the closed position. More specifically, when bolt 124 is extended from lock 122, bolt 124 rests flush against an inner surface of front plate 92 of receiving unit housing 82. The positioning of bolt 124 against front plate 92 prevents access door 84 from being moved to the open position, and thus prevents unauthorized persons without access to the aforementioned key from gaining access to reception cavities 90 where carriers 12 are received and retained at least temporarily. When it is desired that access door 84 be moved from the closed position to the open position, the key is operated in lock 122 to retract bolt 124 into the interior of lock 122 and out of mechanical interference with the inner surface of front plate 92.

In the preferred embodiment of the invention, carrier 12 is in the form of a flexible bag as shown in FIG. 2. In other embodiments of the invention, carrier 12 may be provided in other forms known to those skilled in the art. For instance, carrier 12 may have a rigid body or a body with rigid sections connected by flexible hinge members. In the preferred embodiment, carrier 12 includes an enclosure 126, a sealing plate 128, a weight 129, an alignment ring 130, and a drawstring 132. Enclosure 126 is hollow and substantially cylindrical and is configured to travel through duct system 8 with minimal air leakage and minimal friction between carrier 12 and duct system 8.

Enclosure 126 is a thin-walled flexible and preferably substantially inelastic material such as fiber-reinforced plastic, plastic-coated fabric, or other such material. Enclosure 126 includes a generally planar front 134, a substantially cylindrical sidewall 136, and a rear 138 having a substantially circular entryway 139 that is selectively opened and closed by operation of drawstring 132, as will be set forth more fully below. An interior 140 of enclosure 126 is defined between front 134 and rear 138 and is circumscribed by sidewall 136.

Sealing plate 128 is a substantially circular, planar member having a width substantially greater than its thickness. Sealing plate 128 is manufactured of a resilient flexible or semi-flexible material such as rubber, although other resilient materials may be used without departing from the spirit of the present invention. Weight 129 is a thin plate of relatively heavy material such as steel, although other appropriate materials may be used depending upon the needs of the current configuration and the pneumatic characteristics of power units 10 and duct system 8. Sealing plate 128 and weight 129 are disposed flush against one another, with sealing plate 128 disposed flush against an interior surface of front 134 such that weight 129 faces toward interior 140. Enclosure 126 also includes a substantially circular frontal flap 141 that is disposed against weight 129 within interior 140 to retain sealing plate 128 and weight 129 against front 134.

An annular alignment ring channel 142 is formed in sidewall 136 adjacent rear 138. Alignment ring 130 is disposed in alignment ring channel 142. Alignment ring 130 is an annular flexible or semi-flexible material such as polyethylene or polypropylene, although other materials may be used without departing from the spirit of the present invention. Alignment ring 130 assists in retaining sidewall 136 in a cylindrical configuration and has an outer diameter that is sized to retain sidewall 136 disposed substantially flush against an inner surface of duct system 8 with minimal air leakage and friction therebetween while traveling through duct system 8.

Enclosure 126 is also formed with a string channel 144 that is sized to slidingly carry drawstring 132. String channel 144 extends circumferentially around sidewall 136 at an end thereof opposite front 134. Entryway 139 is circumscribed by string channel 144. Inasmuch as enclosure 126 is flexible, drawstring 132 can be pulled through string channel 144 to minimize the size of entryway 139 to enclose a quantity of cargo within interior 140 of carrier 12. A clip 146 is provided to retain drawstring 132 in a selected position. Likewise, clip 146 can be detached or deactivated to permit drawstring 132 to selectively slide through string channel 144 to enlarge entryway 139 for insertion or removal of the cargo into and out of interior 140.

As indicated hereinbefore, duct system 8 is depicted in FIG. 1 as including first and second duct systems 45 and 46. First and second duct systems 45 and 46 each include one of trunk lines 47 from which extend branches 48. One of power units 10 is operatively connected between each trunk line 47 and receiving unit 6. In this regard, first and second duct systems 45 and 46 operate as separate duct systems. More specifically, system 2 may include either or both of first and second duct systems 45 and 46. If a relatively small number of sending units are needed for the particular application, all of sending units 4 may be operatively connected with first duct system 45. Alternatively, if it is desired to attach a relatively larger number of sending units 4 with receiving unit 6, or if it is desired that certain of sending units 4 are to be operatively kept separate from other of sending units 4, sending units 4 are operatively connected with first and second duct systems 45 and 46 in whatever configuration suits the particular application. If both first and second duct systems 45 and 46 are provided with system 2, first and second duct systems 45 and 46 operate as separate delivery systems that can be operated simultaneously inasmuch as each of first and second duct systems 45 and 46 includes its own trunk line 47 and is connected with its own power unit 10 and reception cavity 90. Sending units 4 of first duct system 45 are thus operatively connected with one another and with one of power units 10. Likewise, sending units 4 of second duct system 46 are operatively connected with one another and with the other power unit 10. Sending units 4 of both first and second duct systems 45 and 46 are, however, both operatively connected with receiving switch 86 and receiving locking mechanism 88 of receiving unit 6 as will be set forth more fully below.

In accordance with the objectives of the present invention, carrier 12 is pneumatically carried from one of sending units 4 through duct system 8 to receiving unit 6. More specifically, as carrier 12 is inserted into insertion opening 24 of one of sending units 4, carrier 12 pushes against insertion door 18 and moves insertion door 18 from the sealed position to the delivery position (FIG. 3A). The movement of insertion door 18 from the sealed position to the delivery position causes locking cam 34 to bias spring tang 40 toward sending switch 22 and simultaneously operates button 42 from the open position to the closed position.

The movement of button 42 to the closed position energizes the sending locking mechanisms 20 of the other sending units 4 that are operatively connected with the first or second duct system 45 or 46 through which carrier 12 is intended to travel. The energizing of such sending locking mechanisms 20 prevents insertion doors 18 of the other sending units 4 connected therewith from moving out of the sealed position. Simultaneously therewith, power unit 10 that is operatively connected therewith is started and a vacuum or reduced fluid pressure is applied to the first or second duct system 45 or 46 to which it is attached. Still simultaneously therewith, receiving locking mechanism 88 is energized to engage plunger 116 in hole 118 and prevent access door 84 from moving out of the closed position.

By retaining in the sealed position insertion doors 18 of sending units 4 that are in fluid communication with sending unit 4 that is delivering carrier 12, and by retaining access door 84 in the closed position, the vacuum or reduced fluid pressure applied by power unit 10 causes fluid to flow only through the branch 48 through which carrier 12 is traveling toward receiving unit 6, thus facilitating the movement of carrier 12 through duct system 8 and reducing the likelihood that carrier 12 may become stuck therein.

As carrier 12 is drawn through branch 48 and trunk line 47 on its way toward receiving unit 6, carrier 12 travels through one or more of Y-shaped tubing sections 50, straight tubing sections 52, and sweeping elbow tubing sections 54. The flexible nature of enclosure 126, sealing plate 128 and alignment ring 130 permits carrier 12 to travel through the tubing section without becoming stuck. Additionally, weight 129 provides inertia to carrier 12 to facilitate the travel of carrier 12 through Y-shaped tubing sections 50 and sweeping elbow tubing sections 54 where carrier 12 might otherwise become stuck. While the mass of the cargo disposed within interior 140 may provide sufficient inertia to prevent carrier 12 from becoming stuck in duct system 8, weight 129 is particularly useful when the cargo disposed within interior 140 is lightweight.

By configuring alignment ring 130 to flexibly and resiliently be of an annular shape, alignment ring 130 automatically axially aligns itself with the interior of duct system 8. Inasmuch as carrier 12 is configured such that alignment ring 130 is axially disposed with an imaginary line extending perpendicularly from the center of sealing plate 128, with sealing plate 128 being perpendicular to the imaginary line, the axial alignment of alignment ring 130 within duct system 8 retains sealing plate 128 and thus front 134 in an orientation perpendicular with the interior of duct system 8 which limits the leakage of air between sealing plate 128 and duct system 8.

Once carrier 12 has traveled through branch 48 and trunk line 47 into braking channel 64 of power unit 10, the velocity of carrier 12 is reduced by the braking effect provided by upper and lower pillow openings 66 and 68. Carrier 12 then drops into reception cavity 90 that is disposed below the particular power unit 10. Reception cavities 90 preferably are configured to accommodate several of carriers 12 therein.

After carrier 12 has dropped from braking channel 64 into reception cavity 90, vacuum source 58 turns off and sending locking mechanisms 20 become de-energized. The aforesaid operation of first and second duct systems 45 and 46 from an active state to an inactive state can occur either after a set duration of time that is controlled by a timing circuit or can result from a switch or other device that is triggered by the dropping of carrier 12 out of braking channel 64. It is understood, however, that such an operation can occur in any of a variety of fashions without departing from the spirit of the present invention.

Figure 10:
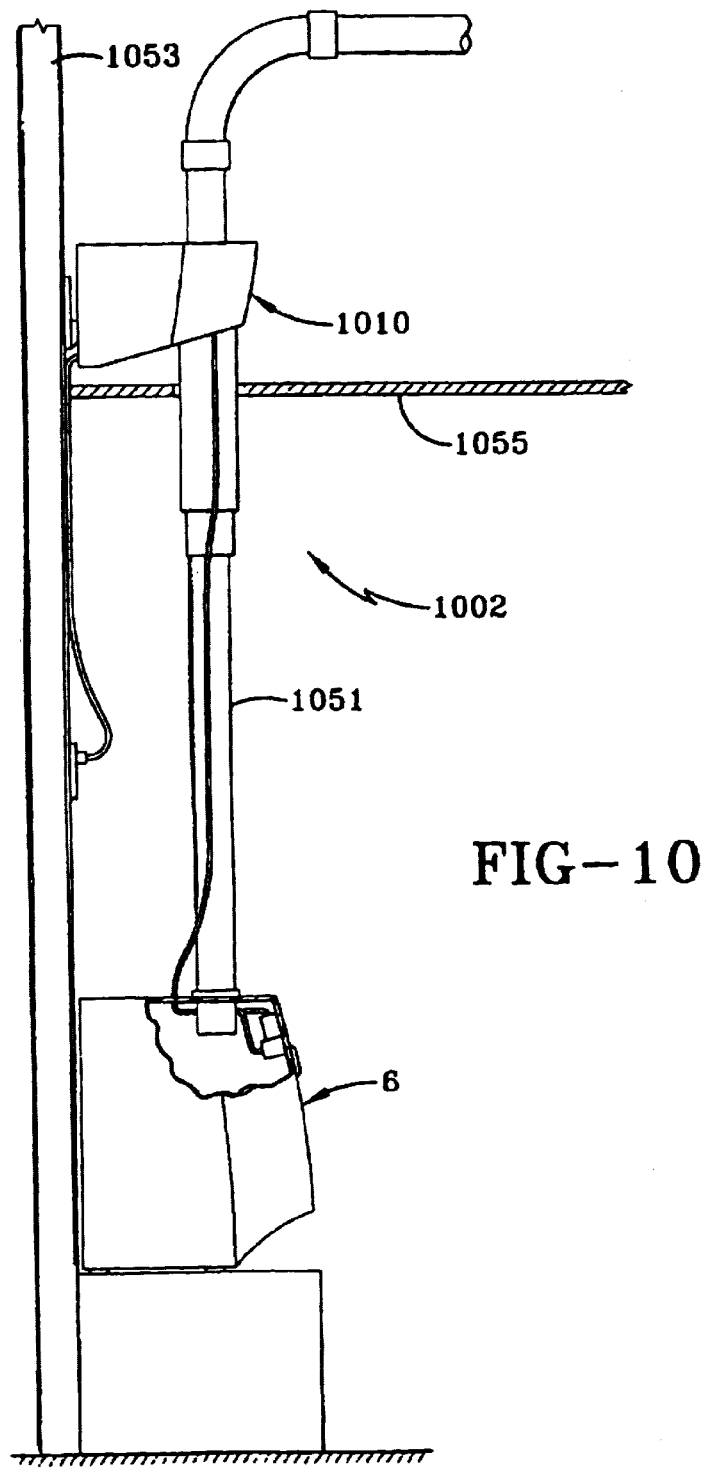
FIG. 10 is a side elevational view of a second embodiment of the present invention.

A second embodiment of the pneumatic delivery system of the present invention is indicated generally at the number 1002 in FIG. 10. System 1002 is similar to system 2, except that power units 1010 are oriented in an upside-down configuration and are spaced a distance above receiving unit 6. A connection line 1051 extends between trunk receptacle 80 and receiving unit 60. Trunk line 47 is connected with braking tube 60 by one of couplings 56. Power unit 1010 is attached to a wall 1053 with an appropriate attachment device. Power unit 1010 is spaced above receiving unit 6 for the purpose of positioning power unit 1010 above a ceiling 1055 or other such structure disposed above receiving unit 6. In so doing, power units 1010 are removed from the immediate vicinity of receiving unit 6 such that any noise generated by power units 1010 can be concentrated in a location remote from receiving unit 6.

When carrier 12 passes through braking channel 64 of power unit 1010, carrier 12 is decelerated first by lower pillow openings 68 and then by upper pillow openings 66. More specifically, lower pillow openings 68 are disposed at an elevation vertically higher than upper pillow openings 66 in power unit 1010. As such, carrier 12 traveling through braking channel 64 toward receiving unit 6 first passes lower pillow openings 68 before passing upper pillow openings 66. As such, when carrier 12 is intermediate lower and upper pillow openings 68 and 66, lower pillow openings 68 apply a vacuum or reduced fluid pressure to rear 138 of carrier 12 to provide an initial decelerating force thereto. Once carrier 12 has traveled past upper pillow openings 66, both lower and upper pillow openings 68 and 66 apply a vacuum to rear 138 to further reduce the velocity of carrier 12. It can be seen, therefore, that power unit 1010 applies a vacuum or reduced fluid pressure to trunk line 47 and reduces the velocity of carrier 12 first with lower pillow openings 68 and then with both lower and upper pillow openings 68 and 66.

Systems 2 and 1002 thus provide one-way communication between sending units 4 and receiving units 6. Duct system 8 and carrier 12 are configured to prevent carrier 12 from becoming stuck in duct system 8 and thus substantially increase the likelihood that carrier 12 will arrive at receiving unit 6 without becoming stuck in duct system 8. Power units 10 and 1010 apply a vacuum or reduced fluid pressure to pull carrier 12 from one of sending units 4 for delivery to receiving unit 6 and reduce the velocity of carrier 12 by application of the vacuum through upper and lower pillow openings 66 and 68.

It can be seen, therefore, that systems 2 and 1002 deliver carriers 12 from a plurality of initial locations to a single terminal location with the use of first and second duct systems 45 and 46 that each permit a plurality of branches 48 to be operatively connected with a single trunk line 47. Such a configuration reduces the physical space occupied by systems 2 and 1002 and enhances the simplicity of systems 2 and 1002. The pair of reception cavities 90 formed in receiving unit 6 further increase the versatility of systems 2 and 1002 inasmuch as separate duct systems can be supplied for separate purposes, or a single duct system can be provided as needed. The configuration of sending units 4 and receiving unit 6 with insertion doors 18 and access door 84, respectively, and the operative interconnection therebetween, increase the reliability of systems 2 and 1002 by causing the vacuum to be applied directly to branch 48 that carries carrier 12 therein and reduces the required power of power units 10 by minimizing the leakage of air and other fluids into duct system 8 through sending units 4 and receiving unit 6. The configuration of power units 10 provides both a braking effect for carriers 12 and prevents the insertion of fingers and/or foreign objects into vacuum source 8, which operates both as a safety measure and as a reliability feature. The configuration of carrier 12 with sealing plate 128 and alignment ring 130 provides a flexible, lightweight device that carries a quantity of cargo therein through the interconnected pipe sections that make up duct system 8 without becoming stuck therein.

Accordingly, the improved one-way pneumatic delivery system is simplified, provides an effective, safe, inexpensive, and efficient device and sequence of operation which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention us by way of example, and the scope of the invention is not limited to the exact details shown or described.

Having now described the features, discoveries and principles of the invention, the manner in which the one-way pneumatic delivery system is constructed, used and carried out, the characteristics of the system and method, and the advantageous, new and useful results obtained; the new and useful structures, devices, elements, arrangements, parts, combinations and method steps, are set forth in the appended claims.

I claim:

1. A system adapted to move a carrier from one of a plurality of initial locations to a common terminal location; the carrier having a length; the system comprising:
    a plurality of first sending units, each first sending unit defining one of the initial locations;
    a receiving unit disposed at the common terminal location; and
    a first duct system extending from each of the first sending units to the first receiving unit;
        the first duct system adapted to allow a carrier to be moved from any one of the first sending units to the receiving unit; and
    a first power unit having a vacuum source and a braking tube;
        said braking tube being in fluid communication with the first duct system and the vacuum source applying a reduced fluid pressure to the braking tube.

2. The pneumatic delivery system of claim 1, wherein the first duct system includes:
    a first trunk line having an outlet;
    the outlet of the first trunk line being disposed at the receiving unit; and
    a plurality of first branches connected to the first trunk line;
    each of the first branches having an inlet disposed at one of the first sending units.

3. The pneumatic delivery system of claim 2, further comprising:
    a first power unit in fluid communication with the first duct system;
    the first power unit applying a reduced fluid pressure to the first duct system;
    the reduced fluid pressure being adapted to transfer the carrier from the one of the initial locations to the terminal location.

4. The system of claim 3, wherein the first power unit applies a reduced fluid pressure to the first trunk line.

5. A system adapted to move a carrier from one of a plurality of initial locations to a common terminal location; the carrier having a length; the system comprising:
    a plurality of first sending units, each first sending unit defining one of the initial locations;

a receiving unit disposed at the common terminal location; and a first duct system extending from each of the first sending units to the first receiving unit;

the first duct system adapted to allow a carrier to be moved from any one of the first sending units to the receiving unit;

a first power unit having a vacuum source and a braking tube;

the braking tube being formed with an elongated braking channel, an upper pillow opening, and a lower pillow opening;

the braking channel being in fluid communication with the first duct system;

the upper and lower pillow openings being in fluid communication with the braking channel;

the upper and lower pillow openings being longitudinally spaced apart a first distance from one another along the braking channel;

the first distance adapted to be at least as long as the length of the carrier;

the vacuum source being in fluid communication with the braking channel through the upper and lower pillow openings;

the vacuum source applying a reduced fluid pressure to the braking channel through the upper and lower pillow openings.

6. The system of claim 5, further comprising:

a vacuum jacket in fluid communication with the vacuum source and the upper and lower pillow openings;

the vacuum source applying a reduced fluid pressure to the braking channel by applying a reduced fluid pressure to the vacuum jacket.

7. The system of claim 1, further comprising a first power unit attachable to the receiving unit.

8. The system of claim 7, further comprising a first seal interposed between the first power unit and the receiving unit.

9. The system of claim 1, wherein each of the first sending units defines an insertion opening in fluid communication with the first duct system; each of the first sending units further including:

an insertion door movable between a sealed position and a delivery position; and the insertion door substantially preventing the flow of fluid through the insertion opening into the first duct system when in the sealed position.

10. A system adapted to move a carrier from one of a plurality of initial locations to a common terminal location; the carrier having a length; the system comprising:

a plurality of first sending units, each first sending unit defining one of the initial locations;

a receiving unit disposed at the common terminal location;

a first duct system extending from each of the first sending units to the first receiving unit;

the first duct system adapted to allow a carrier to be moved from any one of the first sending units to the receiving unit, wherein each of the first sending units defines an insertion opening in fluid communication with the first duct system;

each of the first sending units further including:

an insertion door movable between a sealed position and a delivery position; the insertion door substantially preventing the flow of fluid through the insertion opening into the first duct system when in the sealed position;

wherein each first sending unit further includes:

a sending locking mechanism being movable between a de-energized position and an energized position;

the insertion door being movable between the sealed and delivery positions when the sending locking mechanism is in the de-energized position; and the energized position of the sending locking mechanism adapted to hold the insertion door in the sealed position.

11. The system of claim 10, wherein each sending locking mechanism includes a solenoid configured to move the locking mechanism between the de-energized and energized positions.

12. The system of claim 11, wherein each sending locking mechanism further includes a locking cam, the locking cam being pivotally mounted on the first sending unit, the locking cam being pivoted by the solenoid.

13. The system of claim 10, wherein the sending locking mechanism of one of the first sending units is in communication with at least one other sending locking mechanism.

14. The system of claim 10, wherein each first sending unit further includes:

a sending switch having open and closed positions; and the sending switch being in communication with the sending locking mechanism of at least one other first sending unit.

15. The system of claim 10, further comprising:

a first power unit in fluid communication with the first duct system;

the first power unit selectively applying a reduced fluid pressure to the first duct system;

the reduced fluid pressure being adapted to transfer the carrier from the one of the initial locations to the terminal location;

the first power unit being switchable between an on position and an off position;

the on position of the first power unit corresponding with application of the reduced fluid pressure; and the on position of the first power unit corresponding with at least one of the sending switches being in the closed position.

16. The system of claim 10, wherein the receiving unit is formed with a first reception cavity and a removal opening, the first reception cavity adapted to receive the carrier from the first duct system, the removal opening adapted to provide communication between the first reception cavity and the exterior of the receiving unit.

17. The system of claim 16, wherein the first duct system is in fluid communication with the first reception cavity and further comprising an access door movable between an open position and a closed position, the access door adapted to permit access to the first reception cavity from the exterior of the receiving unit when in the open position, the access door adapted to prevent fluid communication between the exterior of the receiving unit and the first reception cavity when in the closed position.

18. The system of claim 17, wherein the receiving unit further includes a receiving switch movable between an open position and a closed position;

the open position of the receiving switch corresponding with the open position of the access door;

the closed position of the receiving switch corresponding with the closed position of the access door;

all of the sending locking mechanisms of the first sending units being in the energized position when the receiving switch is in the open position; and all of the sending locking mechanisms of the first sending units being in the de-energized position when the receiving switch is in the closed position.

19. The system of claim 18, wherein each first sending unit further includes a sending switch and wherein the receiving unit includes a receiving locking mechanism;

the receiving locking mechanism being movable between a de-energized position and an energized position;

the receiving locking mechanism in the de-energized position permitting the access door to move between the open and closed positions;

the receiving locking mechanism in the energized position preventing the access door in the closed position from moving away from the closed position;

each sending switch being operable between an open position and a closed position;

the de-energized position of the receiving locking mechanism and all of the sending locking mechanisms of the first sending units corresponding with all of the sending switches being in the open position and the receiving switch being in the closed position;

the closed position of the sending switch of any one of the first sending units corresponding with the receiving locking mechanism and the sending locking mechanisms of at least the other of the first sending units being in the energized position; and the open position of the receiving switch corresponding with all of the sending locking mechanisms being in the energized position.

20. The system of claim 1, further comprising:

a plurality of second sending units and a second duct system;

each second sending unit adapted to be disposed at one of the initial locations different than any initial location occupied by one of the first sending units;

the second duct system allowing one-way fluid communication from each second sending unit to the receiving unit;

the second duct system adapted to accommodate the carrier therethrough in transferring the carrier from the one of the plurality of initial locations to the terminal location.

21. The system of claim 20, further comprising:

a second power unit in fluid communication with the second duct system;

the second power unit applying a reduced fluid pressure to the second duct system;

the reduced fluid pressure being adapted to transfer the carrier from the one of the initial locations to the terminal location.

22. The system of claim 1, wherein the carrier is a flexible and collapsible delivery pouch.

23. The system of claim 5, wherein the carrier is a flexible and collapsible delivery pouch.

24. The system of claim 9, wherein each first sending unit further includes:

a sending locking mechanism being movable between a de-energized position and an energized position;

the insertion door movable between the sealed and delivery positions when the sending locking mechanism is in the de-energized position; and the energized position of the sending locking mechanism adapted to hold the insertion door in the sealed position.

25. The system of claim 24, wherein each sending locking mechanism includes a solenoid configures to move the locking mechanism between the de-energized and energized positions.

26. The system of claim 25, wherein each sending locking mechanism further includes a locking cam, the locking cam being pivotally mounted on the first sending unit, the locking cam being pivoted by the solenoid.

27. The system of claim 24, wherein the sending locking mechanism of one of the first sending units is in communication with at least one other sending locking mechanism.

28. The system of claim 24, wherein each first sending unit further includes:

a sending switch having open and closed positions; and the sending switch being in communication with the sending locking mechanism of at least one other first sending unit.

29. The system of claim 24, wherein the first power unit is in fluid communication with the first duct system;

the first power unit selectively applying a reduced fluid pressure to the first duct system;

the reduced fluid pressure being adapted to transfer the carrier from the one of the initial locations to the terminal location;

the first power unit being switchable between an on position and an off position;

the on position of the first power unit corresponding with application of the reduced fluid pressure; and the on position of the first power unit corresponding with at least one of the sending switches being in the closed position.

30. The system of claim 24, wherein the receiving unit is formed with a first reception cavity and a removal opening, the first reception cavity adapted to receive the carrier from the first duct system, the removal opening adapted to provide communication between the first reception cavity and the exterior of the receiving unit.

31. The system of claim 30, wherein the first duct system is in fluid communication with the first reception cavity and further comprising an access door movable between an open position and a closed position, the access door adapted to permit access to the first reception cavity from the exterior of the receiving unit when in the open position, the access door adapted to prevent fluid communication between the exterior of the receiving unit and the first reception cavity when in the closed position.

32. The system of claim 31, wherein the receiving unit further includes a receiving switch movable between an open position and a closed position;

the open position of the receiving switch corresponding with the open position of the access door;

the closed position of the receiving switch corresponding with the closed position of the access door;

all of the sending locking mechanisms of the first sending units being in the energized position when the receiving switch is in the open position; and all of the sending locking mechanisms of the first sending units being in the de-energized position when the receiving switch is in the closed position.

33. The system of claim 32, wherein each first sending unit further includes a sending switch and wherein the receiving unit includes a receiving locking mechanism;

the receiving locking mechanism being movable between a de-energized position and an energized position;

the receiving locking mechanism in the de-energized position permitting the access door to move between the open and closed positions;

the receiving locking mechanism in the energized position preventing the access door in the closed position from moving away from the closed position;

each sending switch being operable between an open position and a closed position;

the de-energized position of the receiving locking mechanism and all of the sending locking mechanisms of the first sending units corresponding with all of the sending switches being in the open position and the receiving switch being in the closed position;

the closed position of the sending switch of any one of the first sending units corresponding with the receiving locking mechanism and the sending locking mechanisms of at least the other of the first sending units being in the energized position; and the open position of the receiving switch corresponding with all of the sending locking mechanisms being in the energized position.

34. The system of claim 10, wherein the carrier is a flexible and collapsible delivery pouch.

* * * * *